July 21, 1959 T. C. MANN 2,895,386
PROFILING MACHINE
Filed Jan. 27, 1955 17 Sheets-Sheet 1

INVENTOR
Theodore
C. Mann
by Carlson, Pitzner, Hubbard & Wolfe
ATTORNEY

July 21, 1959
T. C. MANN
2,895,386
PROFILING MACHINE
Filed Jan. 27, 1955
17 Sheets-Sheet 2
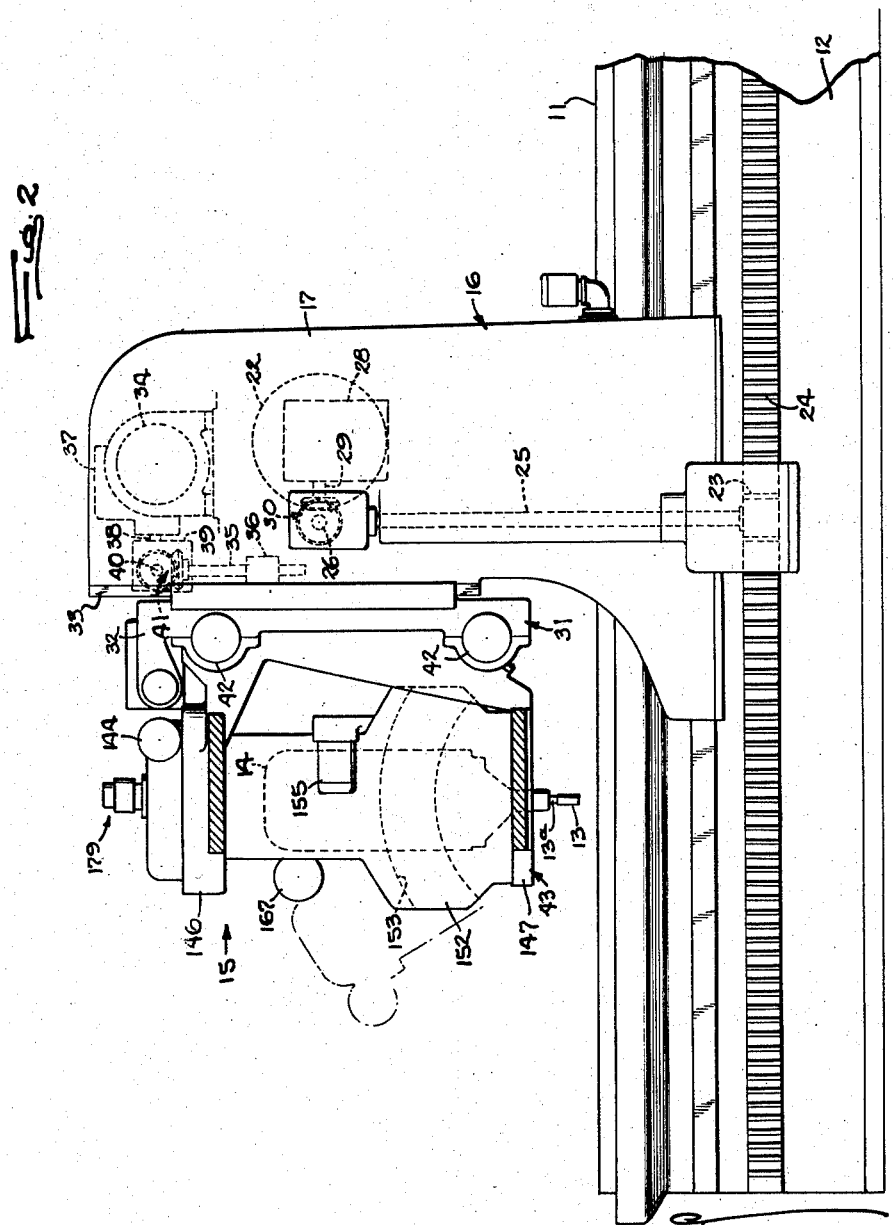

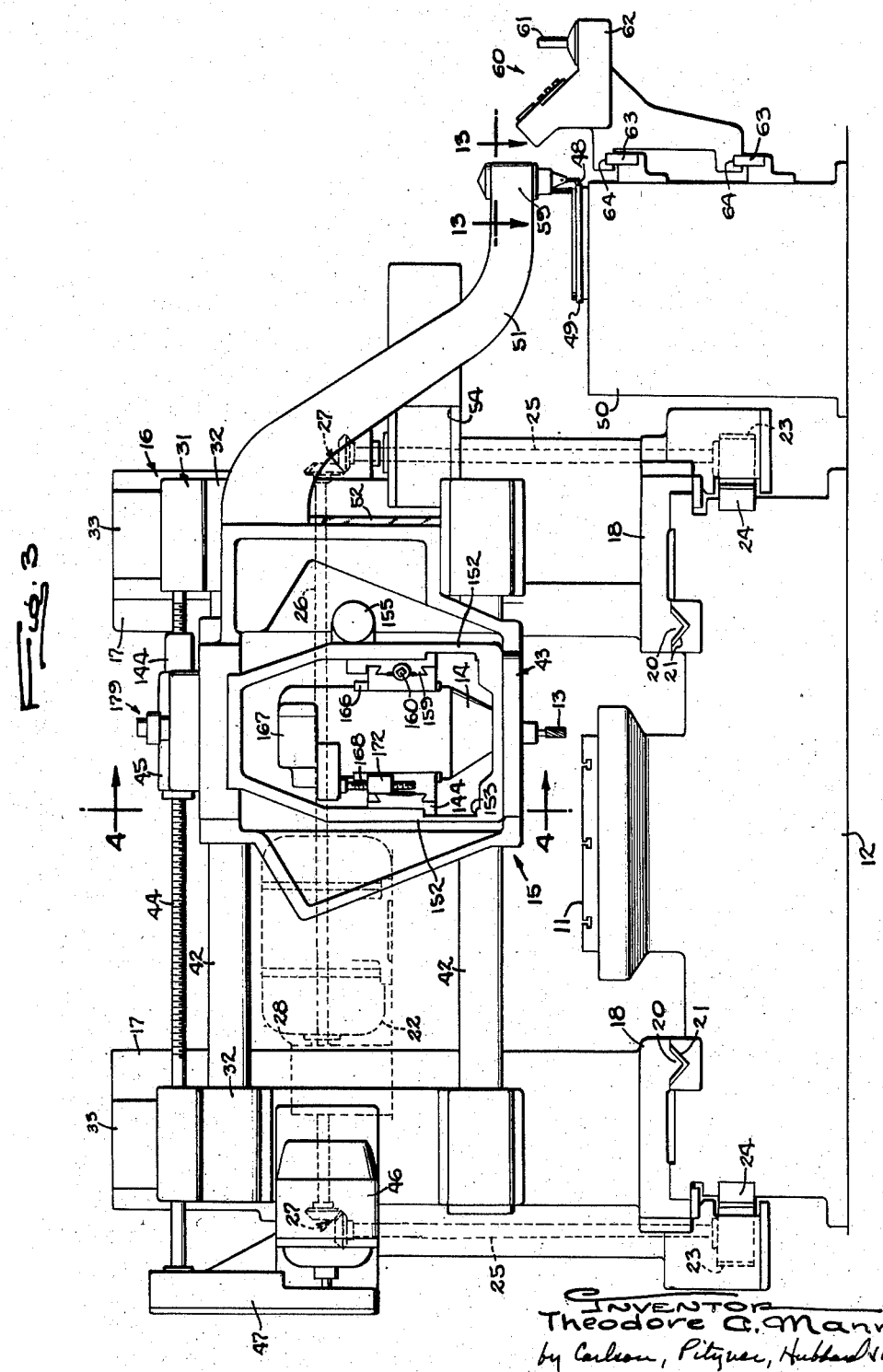

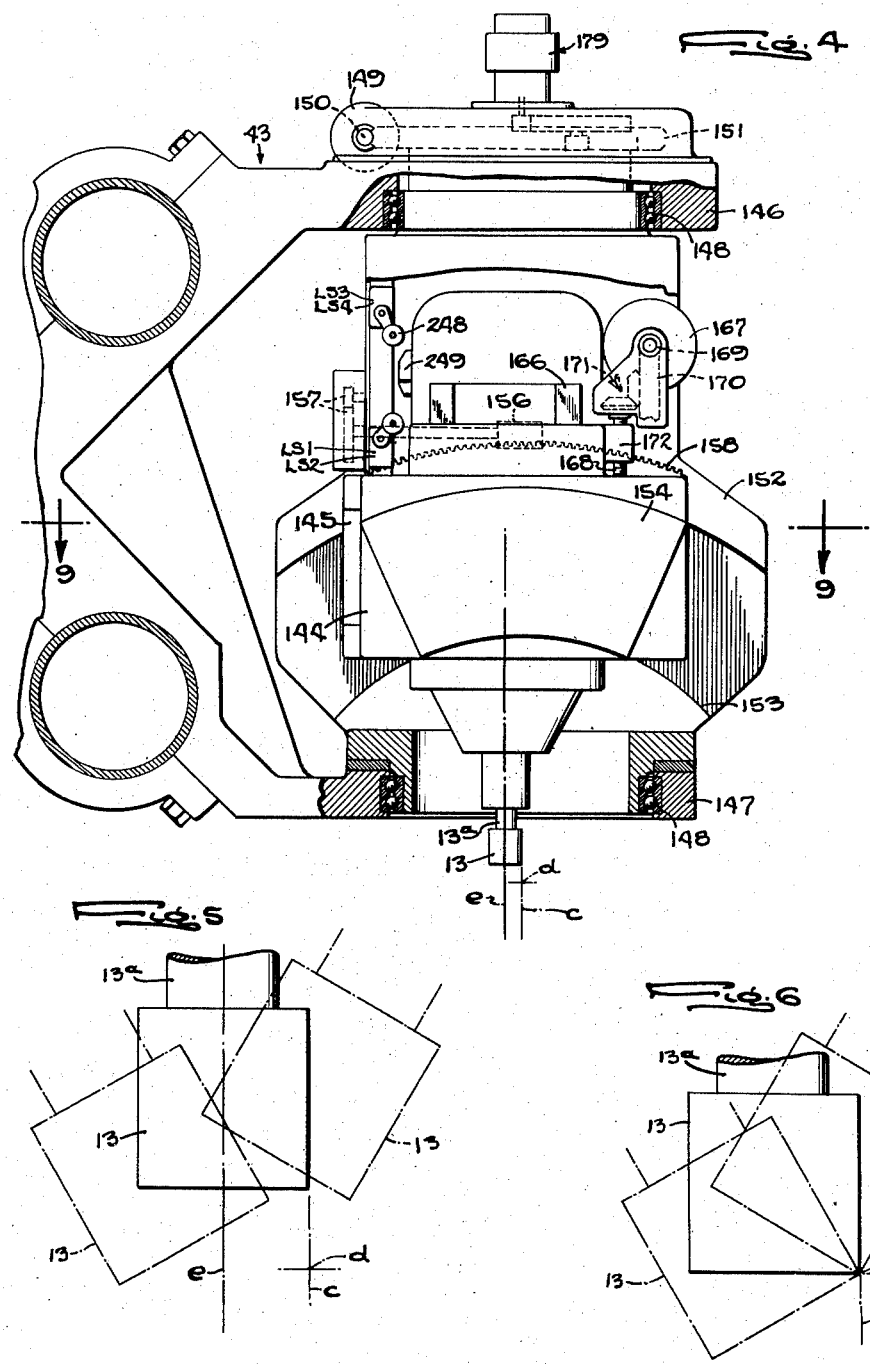

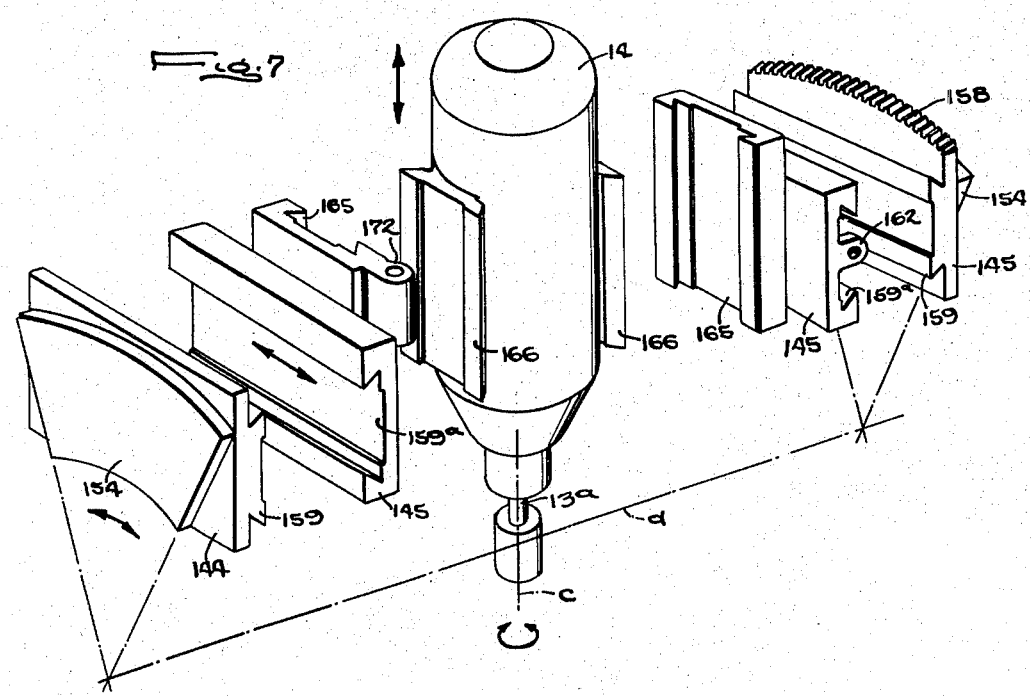
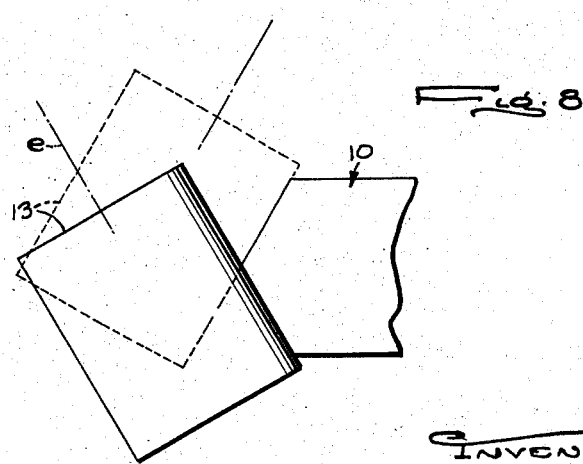

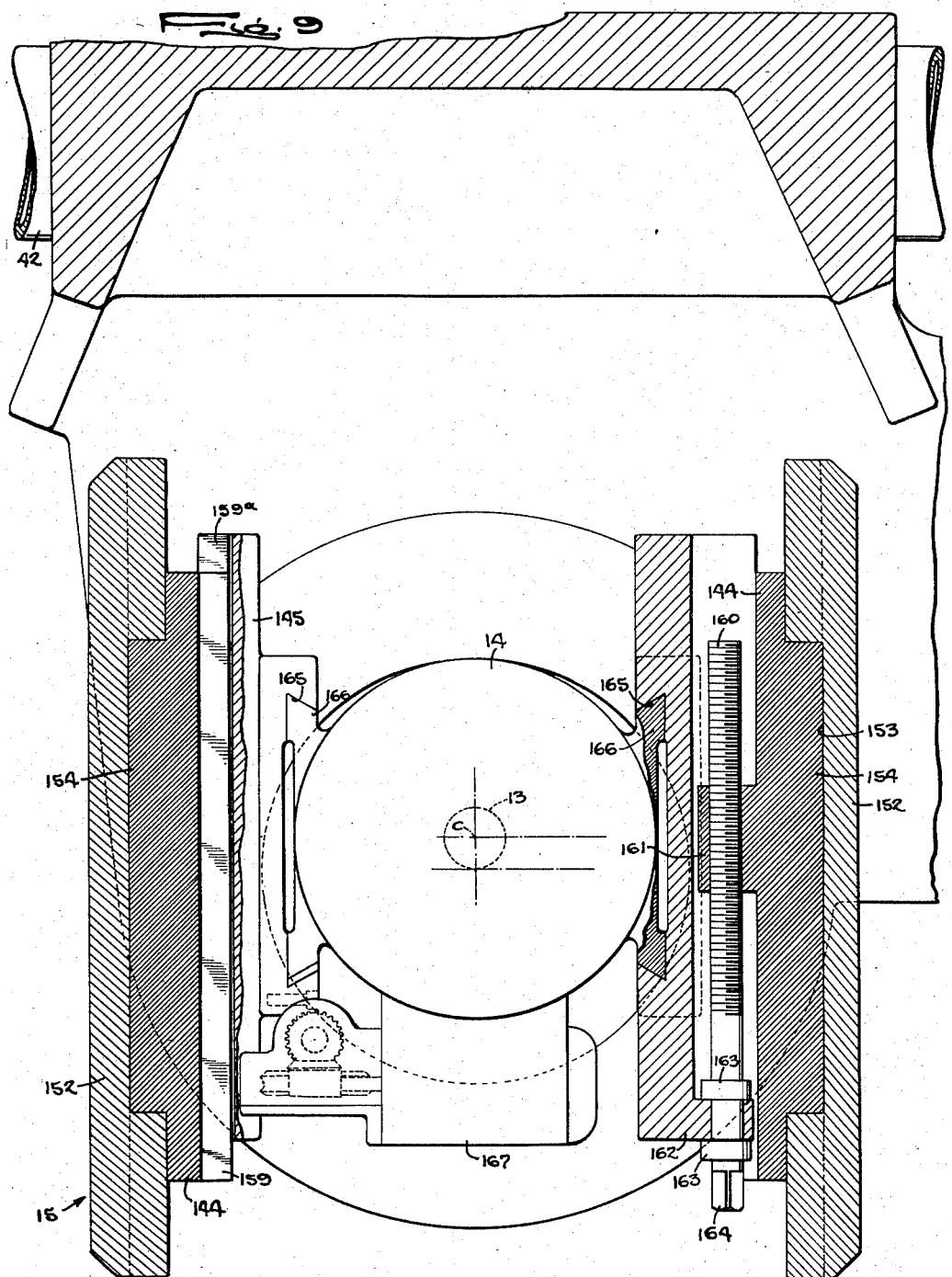

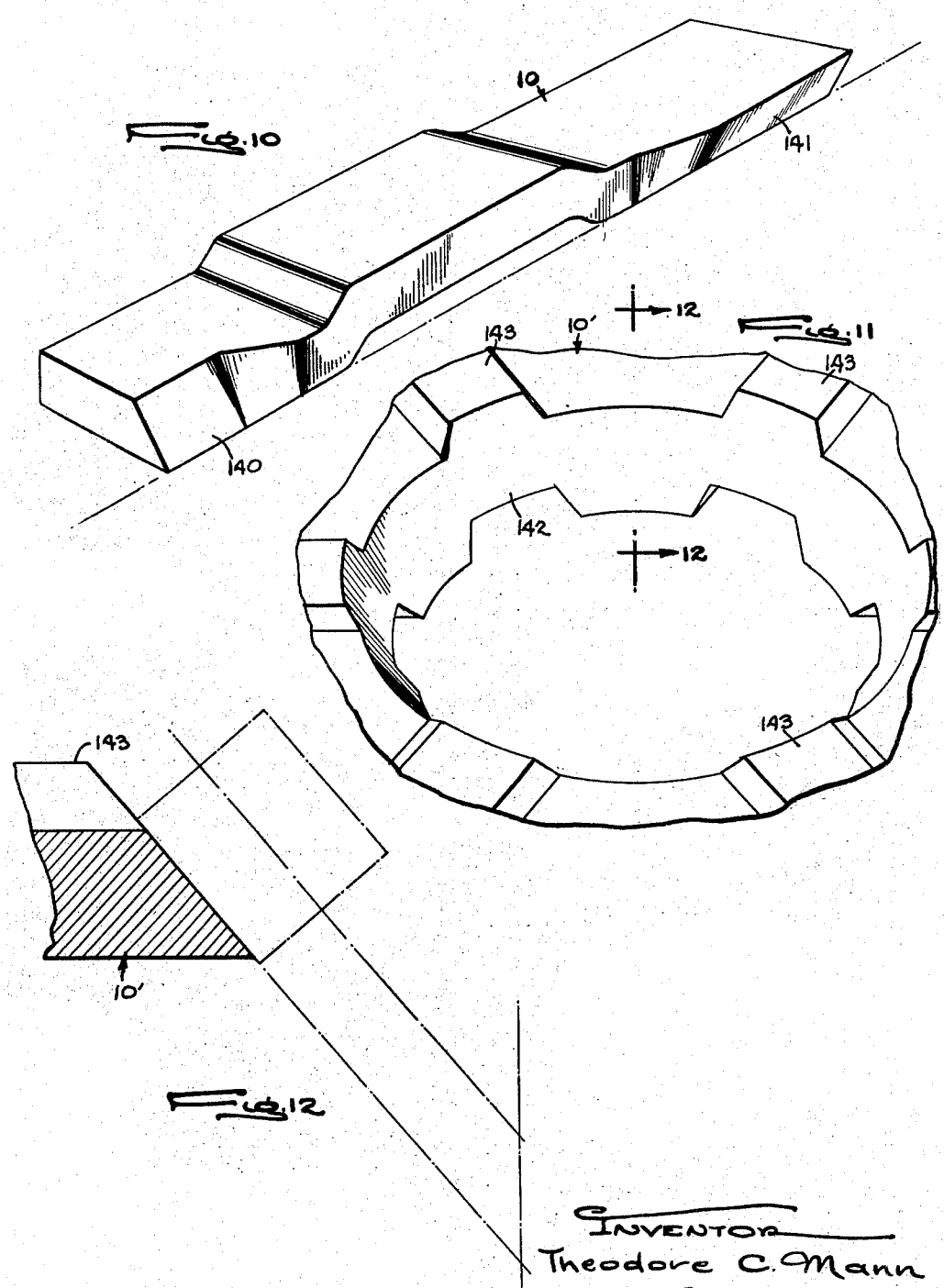

July 21, 1959  T. C. MANN  2,895,386
PROFILING MACHINE
Filed Jan. 27, 1955  17 Sheets-Sheet 8
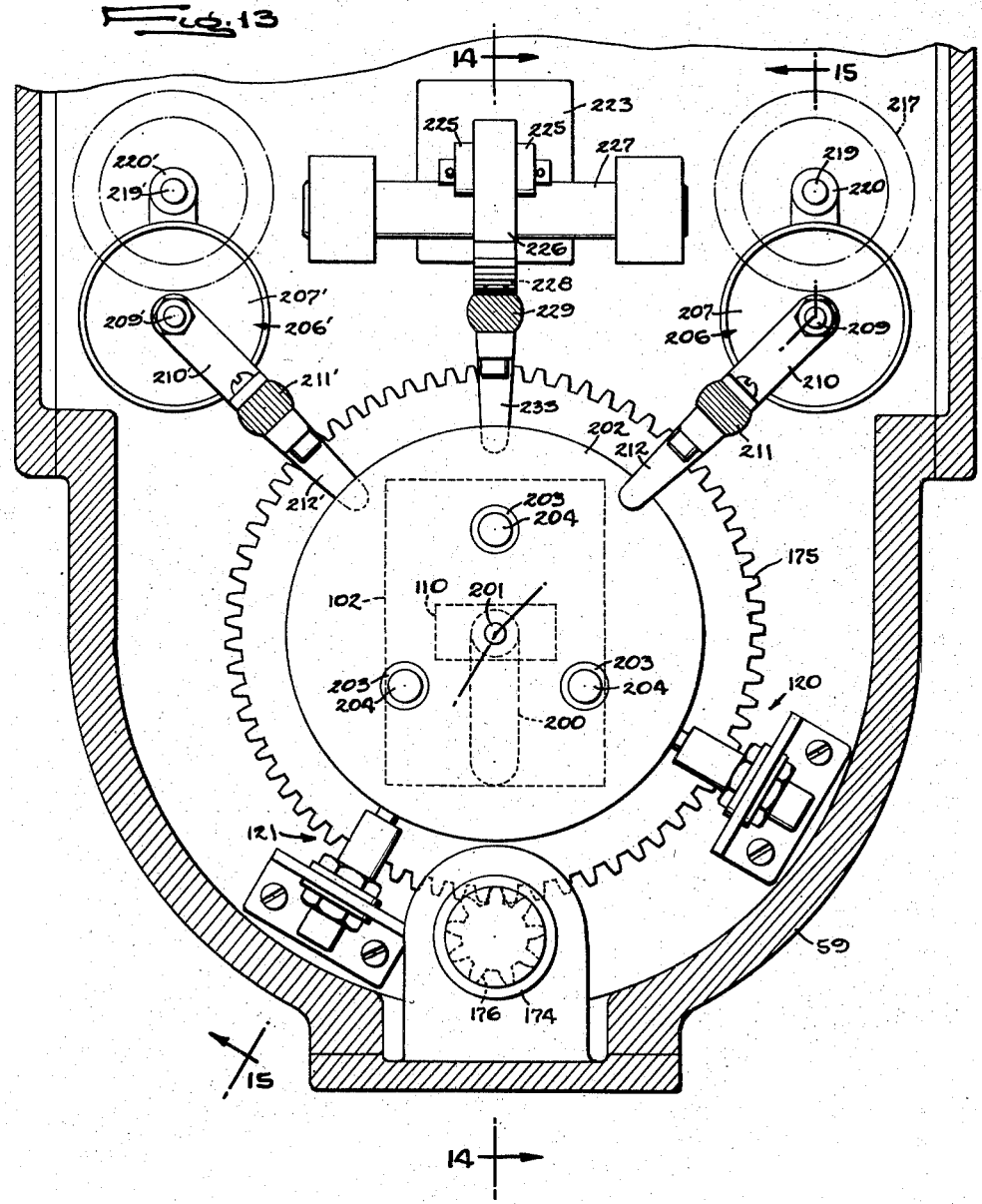
INVENTOR
Theodore C. Mann
by Carlson, Pitzner, Hubbard & Wolfe
ATTORNEY July 21, 1959

T. C. MANN 2,895,386

PROFILING MACHINE

Filed Jan. 27, 1955

INVENTOR
Theodore C. Mann
by Carlson, Pitzner, Hubbard & Wolfe
ATTORNEY

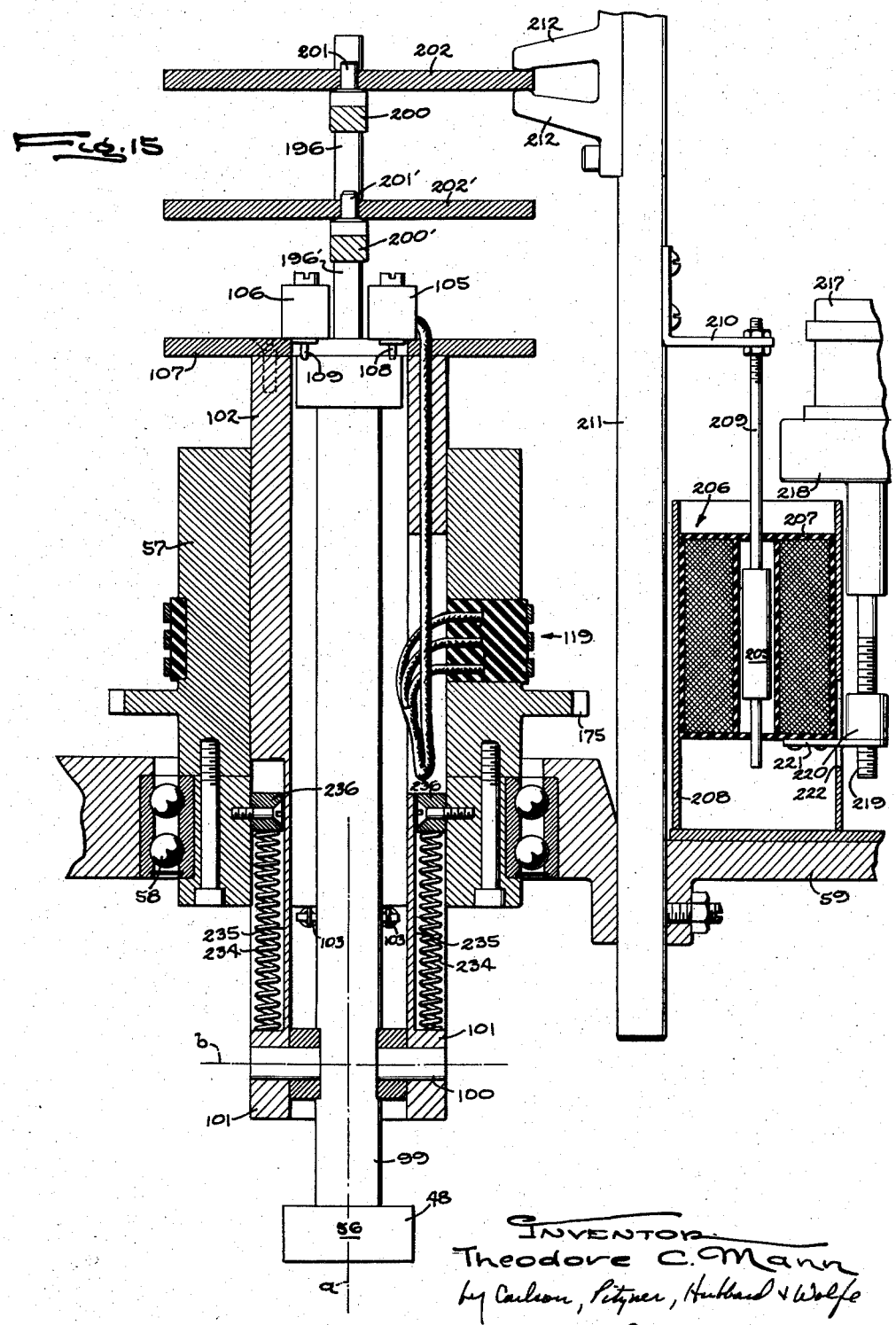

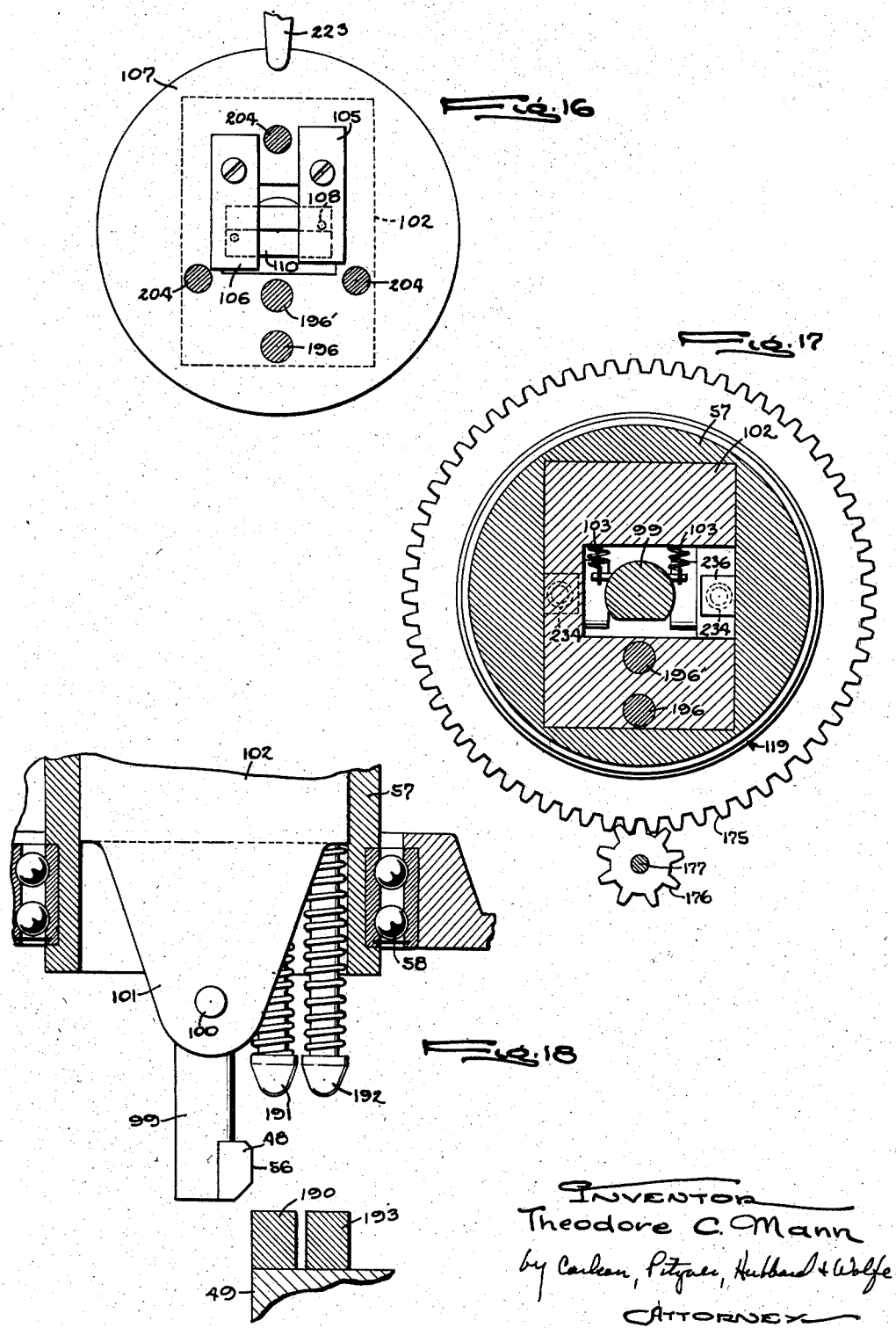

July 21, 1959 T. C. MANN 2,895,386
PROFILING MACHINE
Filed Jan. 27, 1955 17 Sheets-Sheet 12
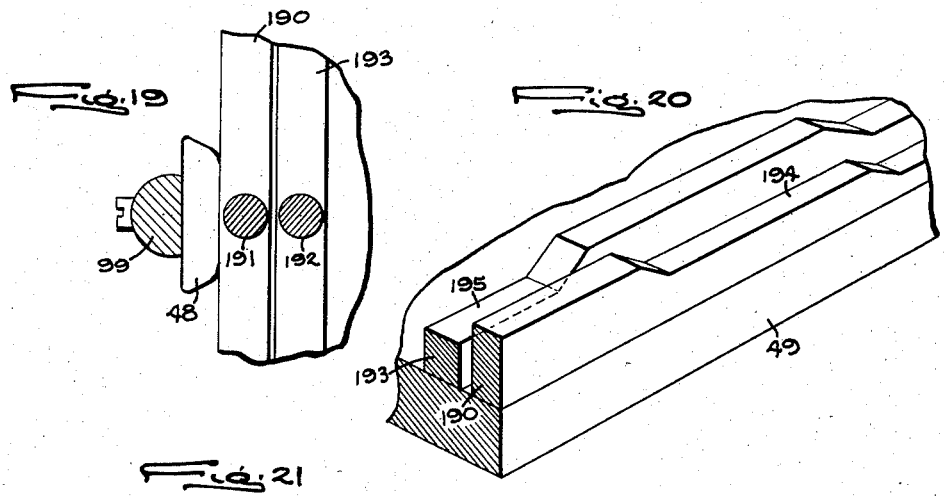
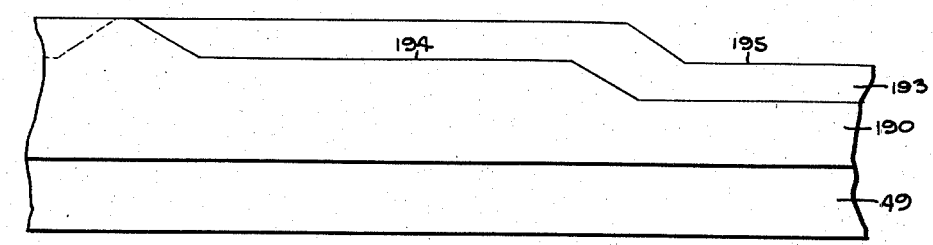
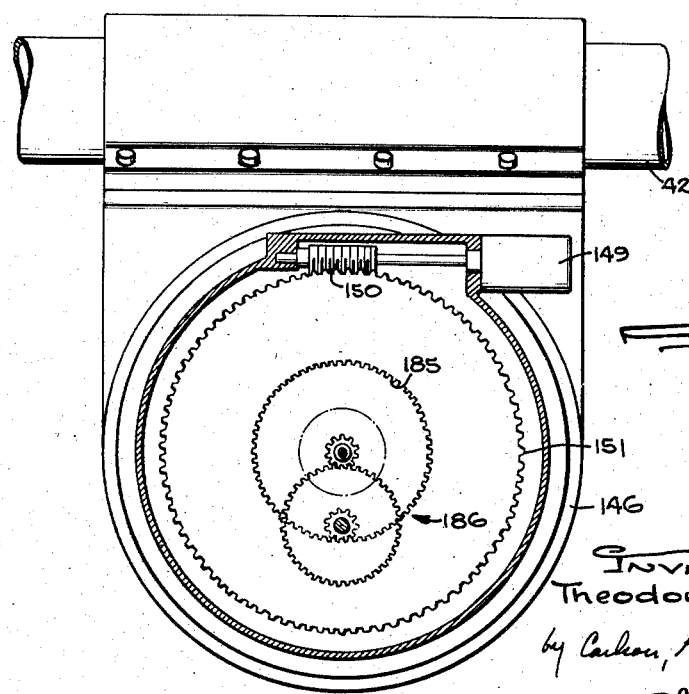
INVENTOR
Theodore C. Mann
by Carlson, Pitzner, Hubbard & Wolfe
ATTORNEYS

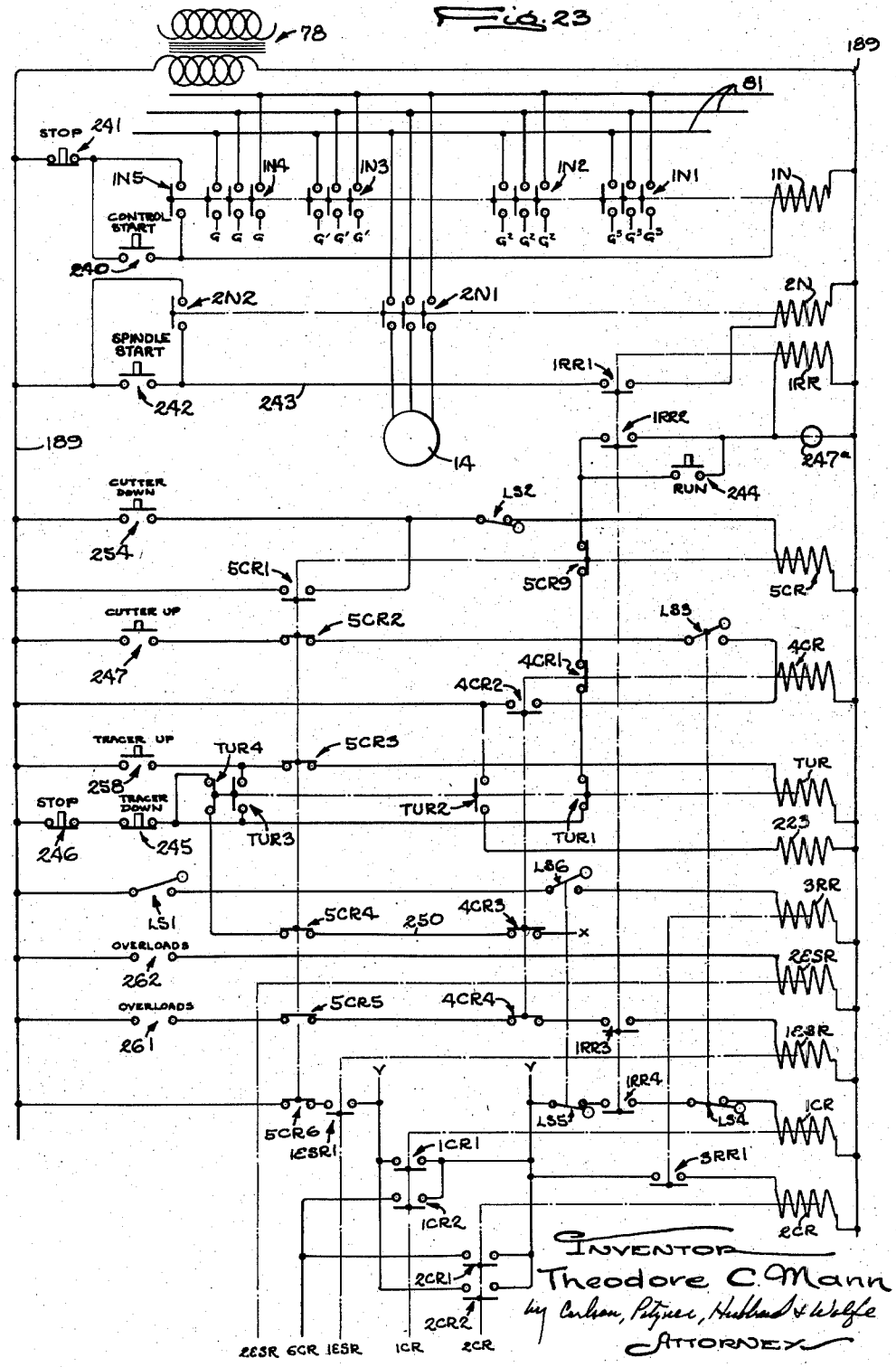

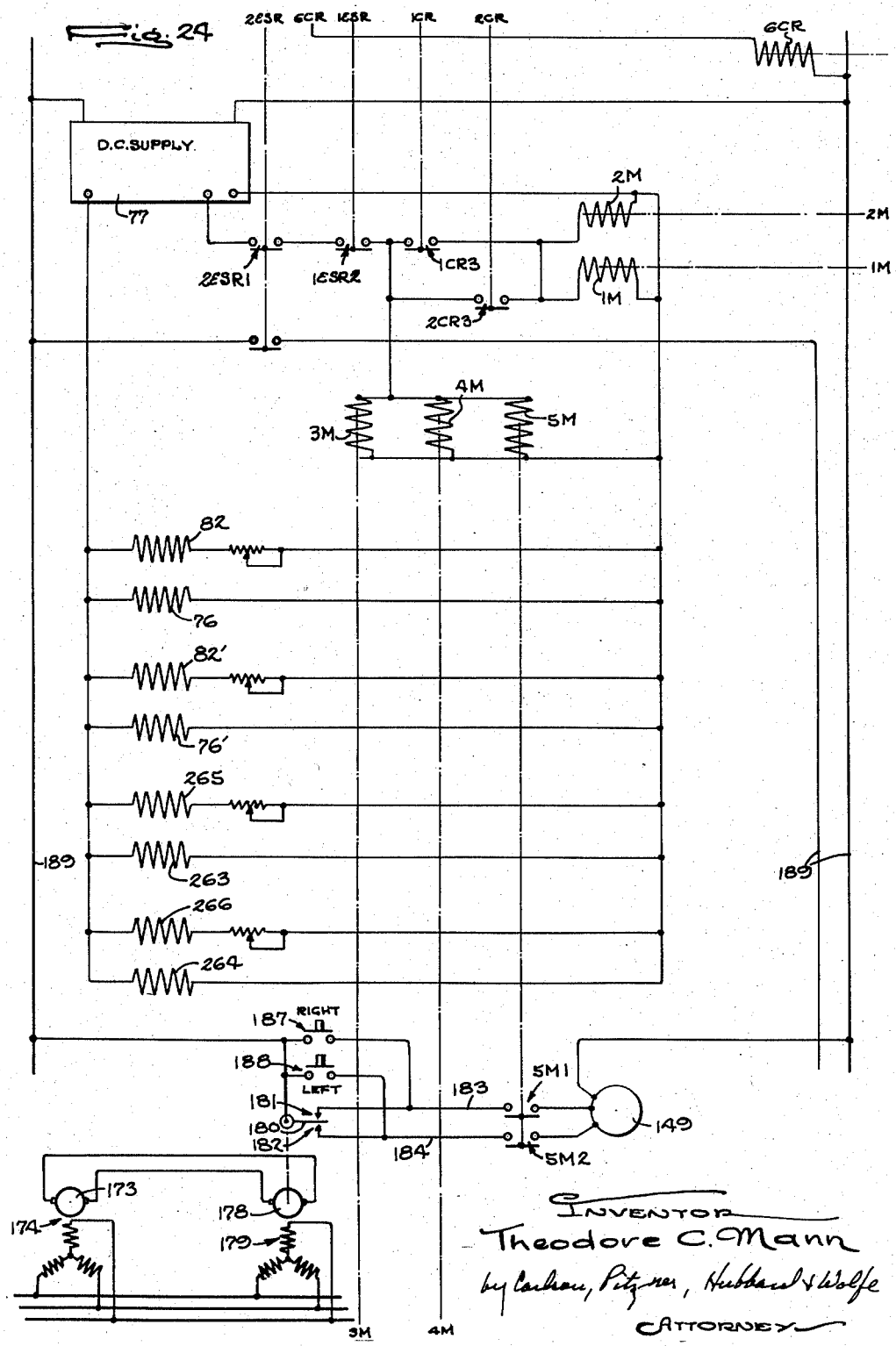

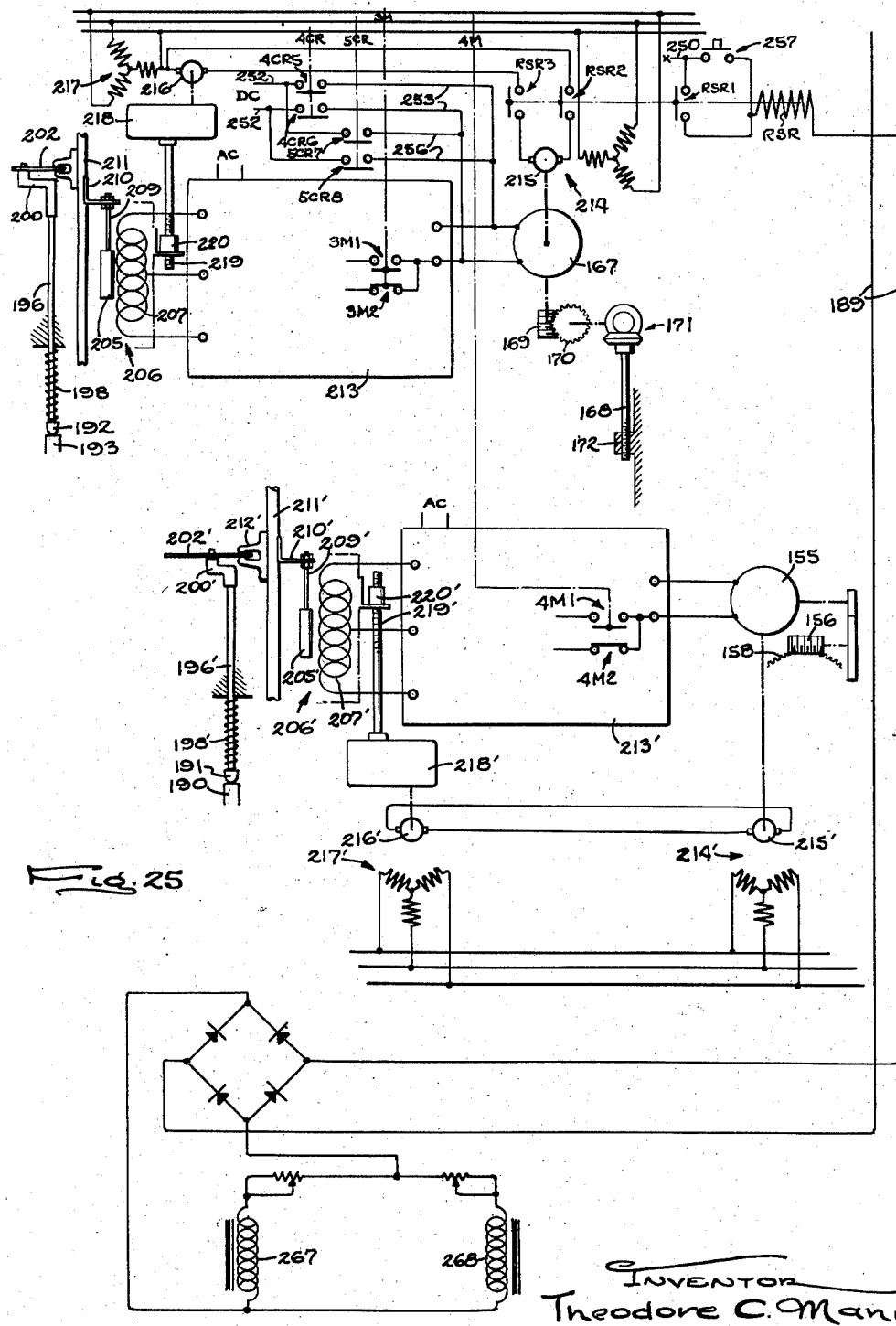

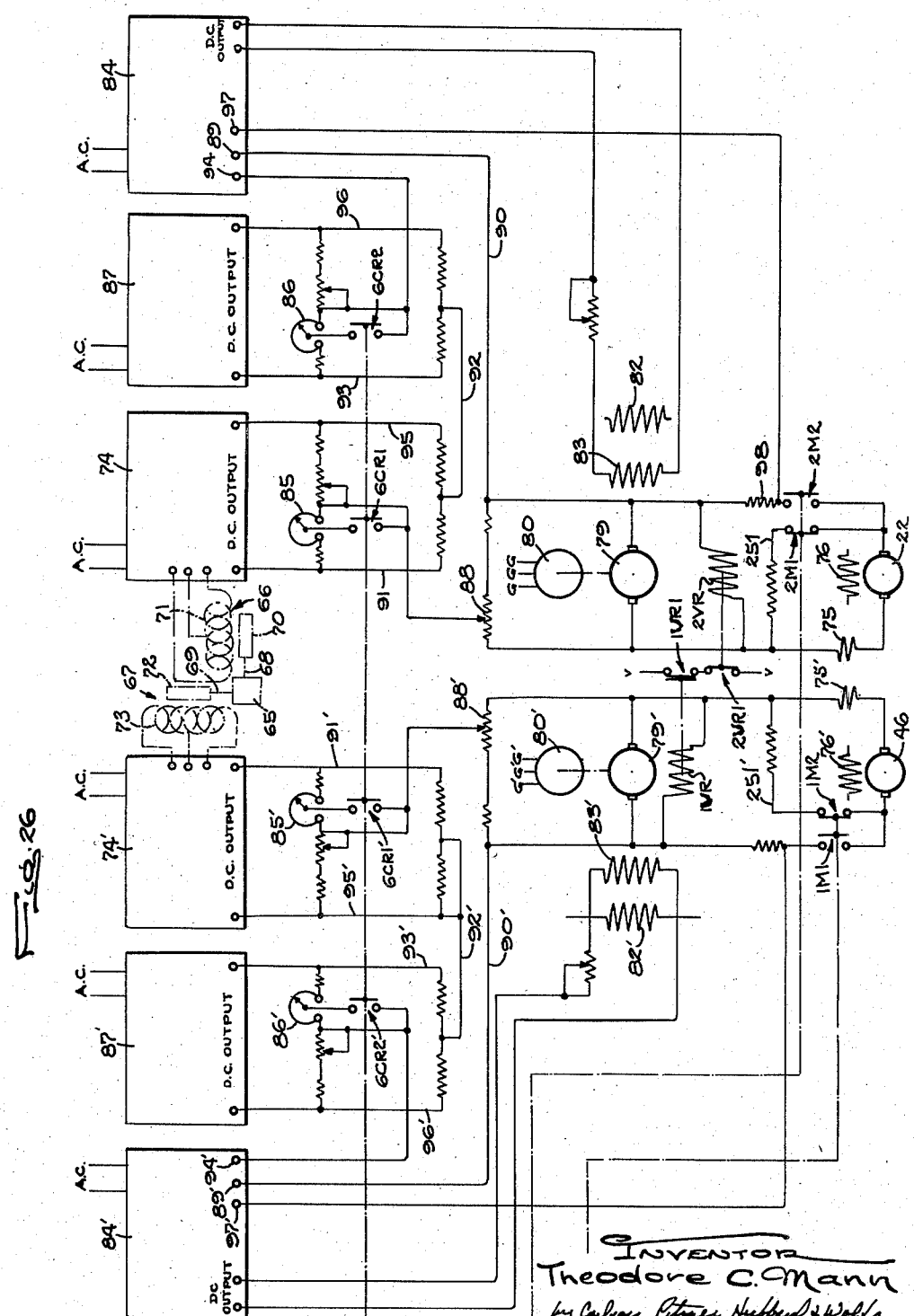

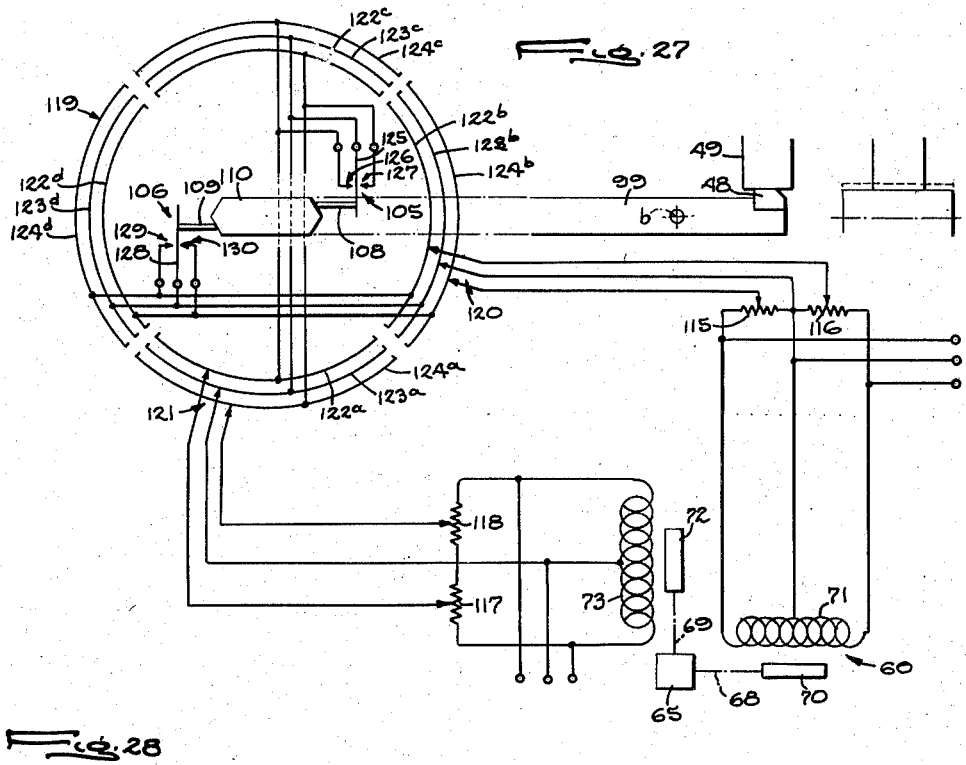
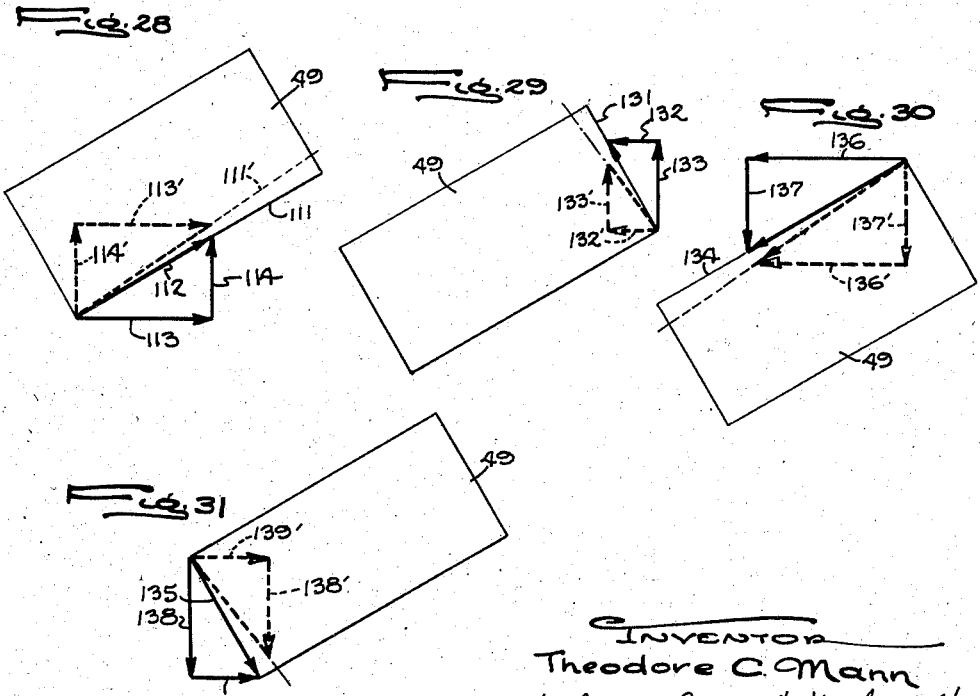

United States Patent Office 2,895,386
Patented July 21, 1959

2,895,386

PROFILING MACHINE

Theodore C. Mann, Beloit, Wis., assignor to Ekstrom-Carlson & Co., Rockford, Ill., a corporation of Illinois Application January 27, 1955, Serial No. 484,381

9 Claims. (Cl. 90—13)

This invention relates to milling machines in which a cutter is traversed around a workpiece to give the latter a desired contour. According to certain of its aspects, the invention relates to such a machine in which the axis of the spindle may be tilted to cut a beveled edge on the workpiece. In other respects, the invention also has reference to a machine in which the work is supported on a stationary table and the tool is carried by a frame movable in a predetermined direction on a slide which is movable in a perpendicular direction on the table so that the compound movements of the slide and the frame traverse the tool in any desired direction through a full circle.

The general object of the invention is to provide a new and improved machine of the above character which, without the need for special and complex compensating mechanisms, cuts the workpiece to the exact shape desired with the proper bevel at all points along the work edge and this even though the edge extends through an angle such as a complete circle.

A more detailed object is to support the cutter spindle for tilting on a member which is rotatable on the frame about an axis normal to the work and to turn the member about this axis in synchronism with and through the same angles as the tool as the latter is fed angularly around the workpiece so as to maintain both the proper bevel angle and the proper contour of the work.

Another object is to control the tilting from a pattern element as the tool moves around the workpiece so as to make it possible to vary the bevel angle from point to point along the work edge and thus produce varying bevels where such are desired.

A further object is to support the tool spindle for axial movement regardless of the tilted position of the latter thereby to locate the tool at selected positions relative to the reference axis of spindle tilting and also to facilitate cutting workpieces having raised and depressed portions.

It also is an object to control the axial shifting of the spindle from a pattern element in order to change the axial position of the tool selectively during the cutting operation.

A more general object is to provide a novel mechanism for controlling the power actuators moving the frame and the slide which mechanism energizes the actuators through the manipulation of a manually movable selector member located at a position remote from the workpiece.

A further object is to achieve the foregoing object by energizing the two actuators in different proportions according to the direction of selector movement so as to move the tool in selected directions and by supporting for movement with the tool a follower which engages a pattern whereby the operator moves the selector to cause the follower to move around the pattern and, as a result, the tool moves along a path similar to that of the follower and cuts the work to the shape of the pattern.

Still another object is to construct the follower so as to sense deviations between the actual direction of selector movement and the direction in which the pattern extends and thereupon to correct the energization of the power actuators and compensate for such deviations.

Another object is to sense deviations by providing a member which supports the follower and moves when the follower tends to advance into or drift away from the pattern and to utilize the movement of this member to change the energization of the actuators.

Other objects and advantages of the invention will become apparent from the following detailed description taken in connection with the accompanying drawings, in which Figure 1 is a perspective view of a milling machine embodying the novel features of the present invention.

Fig. 2 is a fragmentary side elevation of the machine.

Fig. 3 is an end view.

Fig. 4 is an enlarged fragmentary sectional view taken along the line 4—4 in Fig. 3.

Figs. 5 and 6 are enlarged fragmentary views of the cutting tool in different positions.

Fig. 7 is an exploded perspective view of the parts supporting the cutter spindle.

Fig. 8 is a view similar to Fig. 6 but showing the cutter in a different position.

Fig. 9 is an enlarged sectional view taken along the line 9—9 in Fig. 4.

Fig. 10 is a perspective view of a workpiece.

Fig. 11 is a fragmentary perspective view of a different workpiece.

Fig. 12 is a sectional view showing the relationship of the tool and the workpiece.

Fig. 13 is an enlarged sectional view taken along the line 13—13 in Fig. 3.

Fig. 15 is a fragmentary sectional view taken along the line 15—15 in Fig. 13.

Fig. 16 is a fragmentary sectional view taken along the line 16—16 in Fig. 14.

Fig. 17 is a sectional view taken along the line 17—17 in Fig. 14.

Fig. 18 is a fragmentary sectional view similar to Fig. 14 but shows the parts in a different position.

Fig. 19 is a fragmentary plan view of the template and follower.

Fig. 20 is a fragmentary perspective view of the template.

Fig. 21 is a fragmentary side elevation of the template.

Fig. 22 is a fragmentary top view of the head, parts being broken away and shown in section.

Fig. 23 is a wiring diagram of a portion of the control circuit.

Fig. 24 is a wiring diagram of another part of the control and forms a continuation of Fig. 23 at the bottom thereof.

Fig. 25 is a wiring diagram of a third part of the control circuit, this view showing parts schematically and forming a continuation of Fig. 24 at the bottom thereof.

Fig. 26 is a wiring diagram of a fourth part of the control circuit, this view showing parts schematically and forming a continuation of Fig. 24 at the right thereof.

Fig. 27 is a wiring diagram of a fifth part of the control circuit.

Figs. 28, 29, 30 and 31 are schematic views illustrating the manner in which the follower is advanced around the template.

Figure 1:
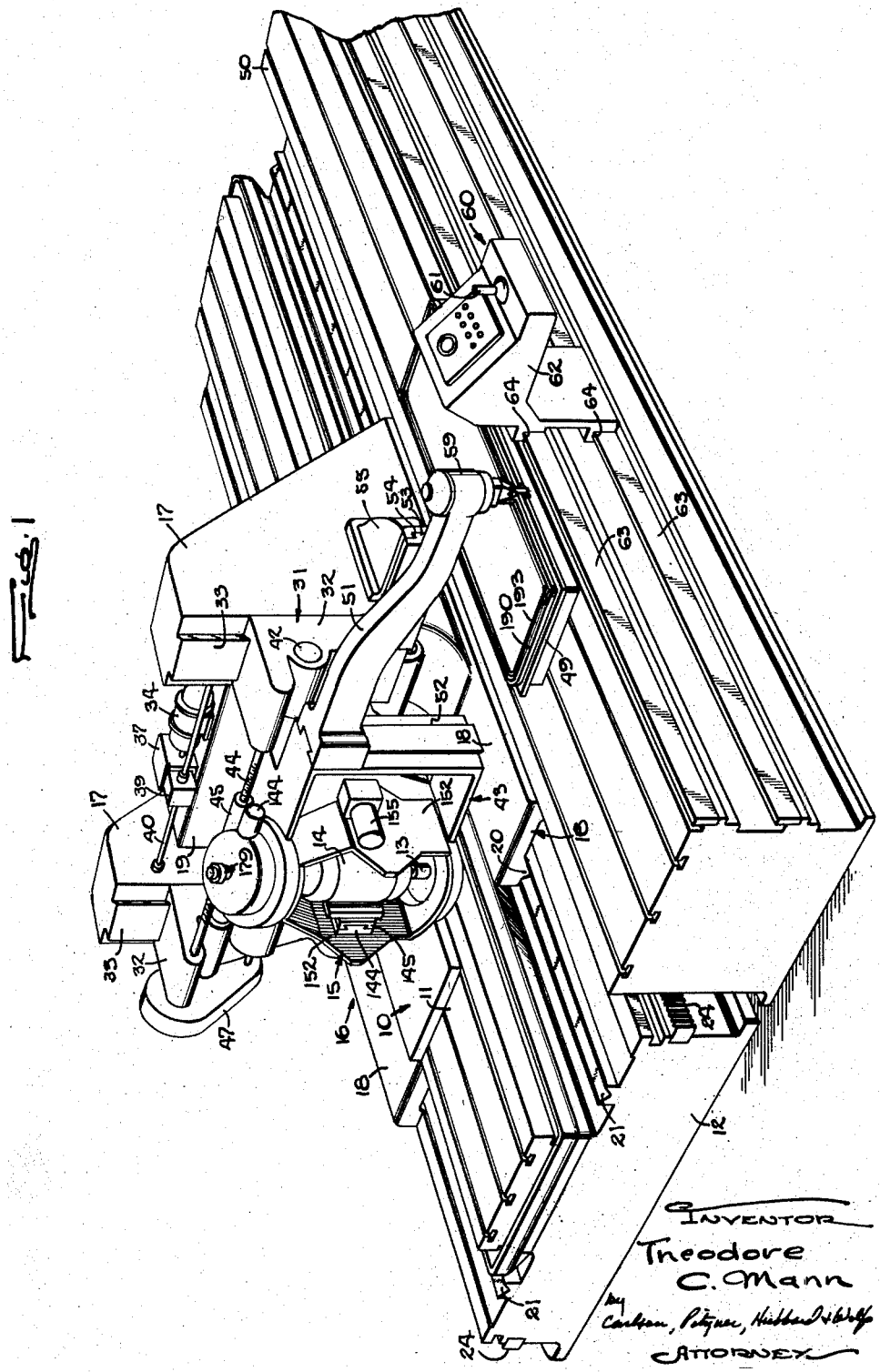

While the invention is capable of a variety of applications and is suitable for many purposes, it is shown herein for purposes of illustration as embodied in milling machines for cutting the periphery of workpieces 10 and 10' (Figs. 10 and 11) thereby determining the contour of the workpiece. Both inside and outside edges may be cut such as is the case in forming some aircraft structural members. For example, it frequently is necessary to form the wing of an aircraft from a single slab of metal which has parts routed out to reduce the weight while the outer edges of the slab are cut to give the wing the proper contour.

In the present instance, the invention is incorporated in milling machines having an elongated horizontal stationary table 11 rigidly secured to the top of a fixed bed 12. A cutting tool 13 driven by a motor 14 is supported above the table on a head 15 and is turned about a vertical axis as the head is traversed over the table and cuts the workpiece secured to the latter. The head is arranged to be moved selectively in any desired direction in a horizontal plane and, for this purpose, it is supported on a slide 16, which moves longitudinally of the table, and also is supported for movement relative to the slide in a direction transversely of the table.

As illustrated in the drawings, the slide 16 is composed of two laterally spaced columns 17 upstanding from elongated horizontal base plates 18 and rigidly connected by a crossbar 19. The latter are disposed on opposite sides of the table 11 and extend lengthwise of the bed 12. Tongues 20 (Figs. 1 and 3) depend from the undersides of the base plates and are received in V-shaped ways 21 rigid with the bed and extending from one end of the bed to the other alongside the table. Thus, the tongues 20 and ways 21 support the columns 17 for sliding longitudinally of the table. Such sliding is effected by power through the medium of a reversible variable speed direct current motor 22 (Fig. 3) mounted on the crossbar 19. The motor turns spur gears 23 disposed at opposite sides of the bed and meshing with horizontal racks 24 which are rigid with the bed sides and extend throughout the length of the bed.

Each gear 23 is fast on the lower end of a vertical shaft 25 (Figs. 2 and 3) journaled on the slide 16 alongside one of the columns 17. The shafts 25 are connected to turn in unison by a horizontal shaft 26 journaled on the crossbar 19 and connected to the upper ends of the shafts 25 through bevel gears 27. The shaft 26 drives the shafts 25 and, in turn, is driven by the motor 22 through a speed reducer 28 (Fig. 2), an output shaft 29 and bevel gears 30 on the shafts 29 and 26. Thus, the motor 22 turns the gears 23 in unison and the gears, in turn, advance back and forth along the racks 24 sliding the columns lengthwise of the table 11.

A saddle 13 supports the head 15 on the slide 16 and slides up and down on the columns 17 to raise and lower the head. To this end, the saddle comprises laterally spaced blocks 32 rigidly connected to each other and sliding on vertical dove-tail ways 33 which are formed on the faces of the columns. The saddle is shifted up and down by a motor 34 which turns vertical screws 35 (Fig. 2) journaled on the columns and threaded through nuts 36 integral with the blocks 32. The screws 35 are driven by the motor 34 through a speed reducer 37 whose output shaft 38 is connected through a gear box 39 to a horizontal shaft 40 journaled on the columns and geared at opposite ends to the screws 35 through bevel gears 41 (Fig. 2).

To support the head 15 for shifting relative to the slide 16, the head slides on vertically spaced horizontal cross rails 42 spanning and connecting the blocks 32. Herein, the rails are in the form of rods whose opposite ends are received in the blocks and a frame 43, which supports the head, encircles the rods as shown in Fig. 4 to slide back and forth on the latter. Such sliding is effected by a power turned screw 44 (Figs. 1 and 3) which is journaled on the saddle 31 and parallels the rods 42. The screw is threaded through a nut 45 which is rigid with the frame 43 so that, when the screw is turned, the nut travels along the screw and causes the frame to slide on the rods 42. The screw is turned by a second reversible variable speed direct current motor 46 (Fig. 3) supported on one of the blocks 32 and driving the screw through a speed reducer 47.

Through the energization of the motors 22 and 46, the slide 16 is moved lengthwise of the table 11 while simultaneously, the frame 43 is shifted transversely of the table. This compound movement results in the tool being traversed across the table in the desired direction which may be changed selectively by varying the relative degrees of energization of the motors.

In this instance, a tracer 48 (Figs. 1 and 3) is carried by the frame 43 to move with the head 15 and the motors 22 and 46 are energized to cause the tracer to follow the contour of a full size pattern 49 secured to the top of a pattern table 50 alongside the bed 12. Since the tracer and the head move together, the tool 13 traverses in the proper directions around the workpiece. As shown in Figs. 1 and 3, the tracer may be carried on the outer end of an arm 51 projecting laterally from the frame 44 and extending over the pattern table 50. The inner end of the arm is received on a vertical dove-tail way 52 facing laterally on the frame 43 so that the saddle 31 may be moved up and down without moving the tracer vertically. The arm is held against vertical movement by a mating dove-tailed tongue 53 and groove 54 formed respectively on the side of the arm and in a bracket 55 on one of the columns 17, the tongue and groove permitting the arm to be moved transversely of the tables 11 and 50.

For a purpose to be described later, the follower 48 turns as it moves around the pattern 49 so that its face 56 (Fig. 14) always is flat against or tangential to the pattern edge. To this end, the follower is carried by a vertical sleeve 57 which is journaled by means of anti-friction bearings 58 (Figs. 14 and 15) in a housing 59 fast on the outer end of the arm 51, the sleeve thus being supported to turn about an upright axis $a$. The face 56 of the follower may be flat and, since this face is held against the edge of the pattern, the flattened face turns the sleeve 57 in the bearings 58 through angles corresponding to the angular changes in the peripheral contour of the pattern.

Preferably, movement of the tracer or follower 49 and hence of the cutter 13 is controlled from a remote control station 60 (Fig. 1) by a manually operable selector device 61 which herein is in the form of a movable vertical rod. The latter is supported by a housing 62 mounted on the pattern table 50 where the operator is able to observe the movements of the tracer as it follows around the pattern 49. Through the medium of ribs 63 on the table projecting into channels 64 in the housing, the housing is free to slide lengthwise of the table and may be shifted back and forth so that the operator may be close to the tracer at all times.

The selector 61 and the means controlled by the selector to energize the motors 22 and 46 may be similar to that disclosed in my copending application Serial No. 402,982, filed January 8, 1954, to which reference may be had for details of construction. In general, the selector is swivelled intermediate its ends and the lower end is connected to a horizontal plate 65, illustrated schematically in Fig. 26, which is shiftable laterally in all directions. Because the plate 65 is attached below the pivot of the selector, it is shifted by but in the opposite direction from the selector. The amount of shifting by the plate is proportional to the distance the selector has been tilted away from its neutral upright position.

Shifting of the plate 65 controls the energization of the motors 22 and 46 so that the motors act together to traverse the tool 13 in the direction in which the selector 61 is tilted. For this purpose, movement of the plate transversely of the table 50 (up and down in Fig. 26) energizes the motor 46 while movement of the plate longitudinally of the table energizes the motor 22. When moved in any direction between the primary directions, the plate causes both motors to be energized, the proportion of energization depending upon the direction the plate is moved and being such to result in the tool advancing in the direction of tilting of the selector.

In the present instance, movement of the plate 65 produces electric signals controlling the energization of the motors 22 and 46 and this is achieved by changing the reactance of two reactor elements 66 and 67 (Fig. 26) which herein are inductive. To this end, the rods 68 and 69 disposed at right angles to each other abut against the edges of the plate 65 and are shiftable longitudinally and transversely of the table 50 respectively so that each rod is shifted an amount corresponding to the distance the plate moves in one of the primary directions. At its outer end, the rod 68 supports a core 70 which is disposed within the inductance coil 71 of the reactor 66 and moves with the rod while a core 72 is similarly carried by the rod 69 within the coil 73 of the reactor 67. The cores are midway between the ends of their respective coils when the selector 61 is in its neutral position.

Each inductance coil 70 and 73 is part of a suitable phase shifting and discriminating network, illustrated schematically at 74 and 74' in Fig. 26, having a unidirectional output whose magnitude varies in accordance with the axial position of the corresponding reactor core. The magnitude of the output of each network, that is, of the variable signal produced by movement of the selector 61, varies from a minimum when the core is at one end of its coil to a maximum when the core is at the other end and varies in a generally straight line so that the output is half the maximum value when the core is centered between the coil ends.

To energize the motors 22 and 46 in accordance with the positions of the reactor cores 70 and 72, shunt wound direct current motors are employed and the voltage through the armature windings and the stabilizing series windings 75 and 75' of these motors is varied in response to movement of the cores while the voltages through the shunt field windings 76 and 76' are constant and are applied by a suitable direct current source 77 connected across an alternating current source 78 (see Figs. 23 and 24). In the case of the motor 22, the voltage through the armature winding is developed by a generator 79 whose output is varied both in direction and magnitude according to the signal of the reactor 66, that is, the output of the phase shifting and discriminating network 74. By controlling the voltage through the armature winding, the reactor controls the speed of the motor and hence the rate at which the tool 13 traverses the work in a direction longitudinally of the table 11.

The generator 79 is driven continuously and at a constant speed during use of the machine by an alternating current motor 80 connected as indicated at G—G—G in Figs. 23 and 26 to power lines 81 supplied by a suitable three phase alternating current source (not shown). The output voltage of the generator is varied by changing the generator field in response to the signal of the reactor 66 so that the output voltage of the generator varies from zero when the core 70 is in its neutral position to a maximum value of one polarity as the core is shifted to its limit position in one direction from the neutral position and to a similar value but of the opposite polarity as the core is moved to its limit position in the opposite direction from the neutral position. For this purpose, two generator field windings 82 and 83 are used. The current flowing through the former is supplied from the direct current supply 77 and is constant so that, when current is flowing through this winding only, the generator output voltage is a maximum of one polarity, for example, 230 volts negative.

In the other generator field winding 83, which is the control field winding, the current produces a flux which opposes the flux produced by the winding 82 and this current is varied in response to movement of the core 70 so that the field resulting from the two windings is varied in accordance with the position of the selector 61. This is achieved by varying the voltage applied to the control field winding from zero to a maximum in response to movement of the core from one end of the coil 71 to the other. The number of turns in the control field winding 83 is correlated with the turns in the winding 82 so that the two windings balance each other and the generator output is zero when the core is in the neutral position. Thus, as the voltage through the winding 83 is increased from zero to the maximum, the field flux resulting from the two windings decreases from a maximum in one direction to zero and then it reverses and increases to a maximum in the opposite direction. As a result, the output voltage of the generator changes accordingly and, in the present instance, varies from 230 volts in the negative sense through zero to a plus 230 volts.

The current in the control field winding 83 is varied by the reactor 66 and is correlated with the position of the core 70 to that, when the core is in the neutral position, the two field windings balance each other and the output of the generator 79 is zero. When the core is shifted to one side or the other of its neutral position, the current in the control field winding is increased or decreased with a corresponding increase in the generator output. In this way, the selector 61 through the core 70 controls the direction and degree of energization of the motor 22 and hence the direction and speed of travel of the slide 16. Herein, the current in the control winding 83 decreases as the core is moved from the neutral position to the left in Fig. 26 to cause the motor 22 to feed the slide 16 to the right (the direction of selector tilting) while the current increases and the feed of the slide is reversed when the core is moved in the opposite direction.

To vary the voltage in the control field winding in response to movement of the core 70, a portion of the reactor signal, that is, the output voltage of the phase shifting and discriminating network 74, is fed into a suitable voltage regulator 84 which in turn controls the voltage applied to the winding 83. The input to the voltage regulator also includes a signal responsive to the load on the tool 13 so that, as the load increases or decreases, the regulator compensates for this by increasing or decreasing the voltage applied to the control field winding 83 to maintain the motor 22 running at a constant speed corresponding to the selected position of the reactor core 70. A third signal fed to the voltage regulator is a biasing signal and is set initially whereby the voltage applied by the regulator to the winding 83 when the reactor core is in the neutral position produces a flux which exactly balances the flux produced by the winding 82.

The portion of the reactor signal applied to the voltage regulator 84 is determined by the setting of a potentiometer 85 connected across the network 74. A similar potentiometer 86 connected across the output of a suitable rectifier 87 is used to produce the biasing signal. The signal responsive to the load characteristics is a feedback signal and is proportional to the voltage drop across a resistor 88 connected to the output of the generator 79 in parallel with the armature of the motor 22. The three signals which constitute the input to the regulator are applied to a closed circuit composed of the potentiometers 85 and 86 and the resistor 88. This circuit extends from a terminal 89 of the regulator through a conductor 90, the resistor 88, contacts 6CR–1, the potentiometer 85, conductors 91, 92 and 93, the potentiometer 86 and contacts 6CR–2 to the terminal 94 of the regulator. Standby circuits 95 and 96 are connected in parallel with the potentiometers 85 and 86 and their respective contacts so that there always is an input to the regulator to maintain the latter in its operating range. Also applied to the regulator is the signal from a second circuit which extends between the terminal 89 and a third terminal 97 and which includes a resistor 98 to limit the output of the regulator and prevent the current in the armature of the motor 22 from exceeding a predetermined value under overload conditions.

A similar control system energizes the motor 46 for the frame 43 in accordance with the movement of the core 72 of the reactor 67 and the corresponding parts of this system are indicated by the same but primed reference characters.

With the foregoing arrangement, the operator tilts the selector 61 toward or away from himself when the cut is to be made along a line extending exactly transversely of the table 11 since such tilting energizes only the cross feed motor 46. For traversing the tool lengthwise of the table, the operator tilts the selector to either the left or the right and this energizes the slide motor 22 alone. In order to feed the tool at an angle to either of the two primary directions of feed, the operator tilts the selector in this angular direction thus moving both reactor cores 70 and 72. This causes both motors 22 and 46 to be energized at speeds proportioned to the movement of the cores. With both motors energized, the slide 16 moves longitudinally and the frame 43 moves transversely of the table 11 resulting in a compound movement which traverses the tool in the desired direction. Regardless of the direction in which the selector is tilted, the speed at which the tool is fed increases as the selector is tilted farther away from its neutral position since this increases the energization of the motors but maintains the same proportion of energization.

According to one of its aspects, the present invention contemplates the provision of a novel means for detecting variations between the direction of selector tilting and the direction of the pattern edge and for automatically changing the relative energization of the motors 22 and 46 to compensate for such variations. Thus, in most instances, the operator will tilt the selector 61 in a direction slightly different from the direction in which the edge of the pattern 49 extends so that the template follower 48 tends either to drift away from or move toward this edge. The means provided by the invention senses such movements and thereupon automatically changes the relative energization of the motors 22 and 46 to bring the follower back toward the pattern or move it away from the latter, whichever the case may be.

Herein, this means comprises a part 99 (Figs. 14 and 15) which supports the follower 49 and is movable in one direction when the follower drifts away from the template 49 and in another direction when the follower tends to move toward the template. This part is arranged to vary the energization of one or both of the motors 22 and 46 selectively and the energization of the motors is increased or decreased as required to compensate for the deviation sensed by movement of the part 99.

The part 99 may, as illustrated in the drawings, be a generally upright rod carrying the follower 48 at its lower end and projecting downwardly through the housing 59 along the axis $a$ of the sleeve 57. Near its lower end, the rod 99 is pivotally supported to swing about a horizontal axis $b$ (Fig. 15) by trunnions 100 which are supported on spaced plates 101 depending from a square block 102 slidable vertically within the sleeve 57. By being square, the block turns with the sleeve but may be moved up and down independently of the sleeve to raise and lower the follower. The axis $b$ parallels the face 56 of the follower 48 which engages the template 49 and thus this axis is parallel to the template edge portion engaged by the follower at any given time. Contractile springs 103 acting between a lug 104 on the block 102 and the rod 99 at a point above the axis $b$ urges the follower forwardly against the template.

Figure 14:
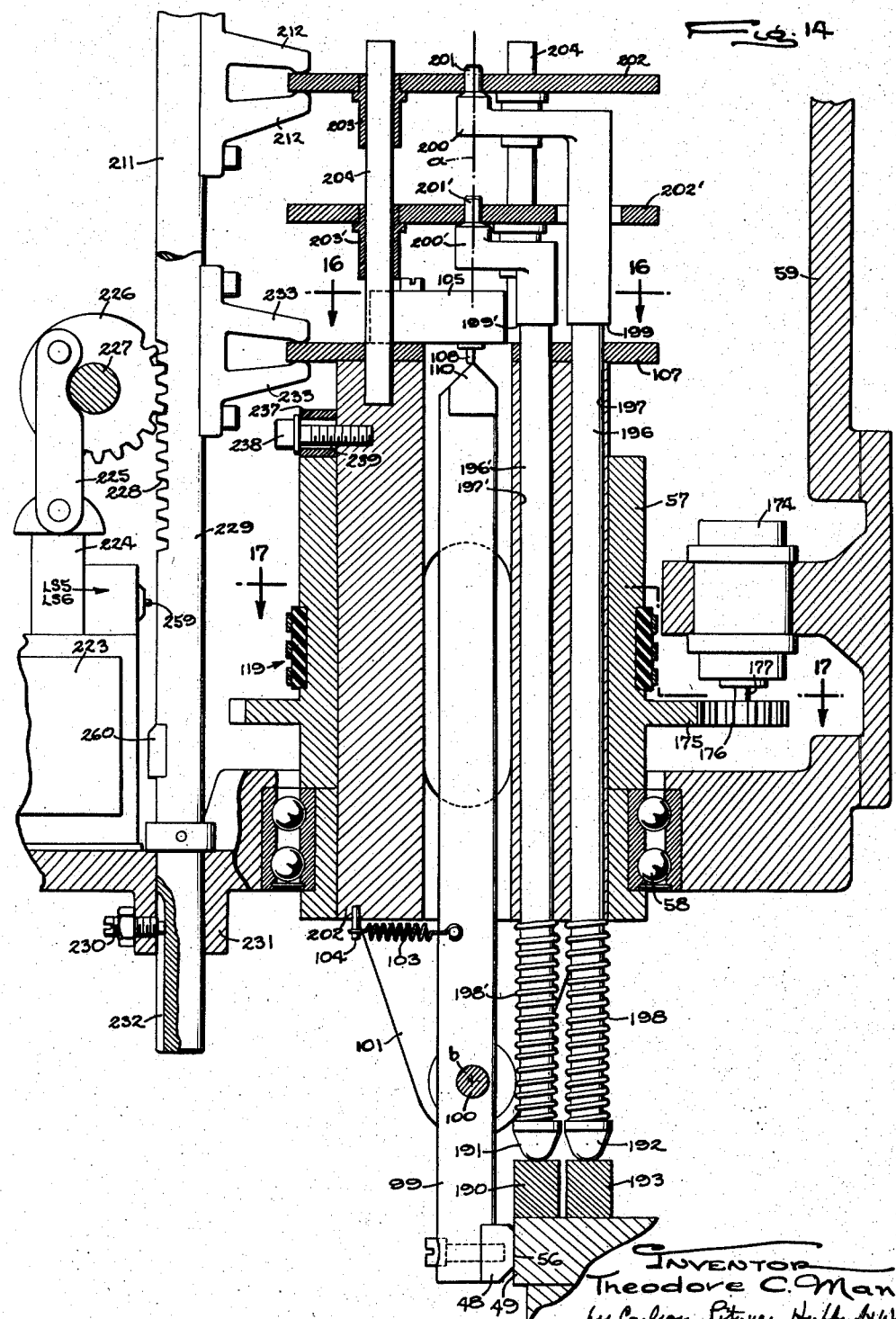
Fig. 14 is a fragmentary sectional view taken along the line 14—14 in Fig. 13.

With the foregoing arrangement, the rod 99 normally assumes the upright position shown in Fig. 14. If the selector 61 should be tilted in such a manner that the follower 48 tends to move into as well as along the template 49, that is, to the right in Fig. 14, the follower will move back relative to the housing 59 causing the rod 99 to turn clockwise about its pivotal axis. In case the selector tilting causes the follower to start drifting away from the template, the spring turns the rod counterclockwise.

Turning of the rod 99 about the axis $b$ is utilized to change selectively the energization of either or both of the motors 22 and 46, this change being such as to move the follower 48 to bring the rod back to the vertical position. To this end, the rod actuates switches 105 and 106 and these switches operate a control system which causes the housing 59 and hence the pivots 100 to move respectively toward and away from the template. This is achieved by connecting the switches to effect a change in the phase shift of one or both of the networks 74 and 74' and thereby change the relative energization of the two motors. Thus, the speeds of the motors are changed and this changes the resultant direction of movement of the follower and also, therefore, of the tool 13.

The switches 105 and 106 are of the single pole double throw type (see Fig. 27) and are actuated by the upper end of the rod 99. Preferably, the switches are spaced several times as far from the axis $b$ as the follower 49 to provide a high degree of sensitivity. The housings of the switches are bolted side by side to a flange 107 on the upper end of the block 102 to slide and turn with the latter. The actuators 108 and 109 for the switches project down on opposite sides of wedge-shaped bar 110 secured to the upper end of the rod 99 so that the switches are oppositely actuated.

In the present instance, tilting of the rod 99 changes the energization of both motors 22 and 46, the energization of one being increased while that of the other is decreased. Assume, for example, that it is desired to move the follower 48 along the template edge 111 as indicated by the arrow 112 in Fig. 28. Accordingly, the motors 22 and 46 should be energized to produce the speed components exemplified by the arrows 113 and 114 respectively. If, however, the selector 61 is tilted somewhat to the left of the proper position, the motors will produce the components shown by the broken line arrows 113' and 114' and tend to move the follower into the template along the line 111'. In this example, therefore, the motor 46 is overenergized while the motor 22 is underenergized. To obtain the proper feed resultant, the speed of the motor 46 is decreased and the speed of the motor 22 is increased.

In order to increase or decrease the energization of the motors 22 and 46 upon rocking of the rod 99, the switches 105 and 106 effect a shift in phase in the networks 74 and 74' and this shift is either counter to or additive to the shift effected by movement of the reactor cores 70 and 72 depending upon which is required to produce the desired correction in the motor speeds. The corrective phase shifting action herein is achieved by changing the resistance of circuits parallel to the reactor coils 71 and 73. Thus, as illustrated in Fig. 27, the switches short circuit a portion of one or the other of two resistors 115 and 116 parallel to the coil 71 and one of two resistors 117 and 118 similarly arranged with respect to the coil 73. The particular resistor of each pair which is short circuited depends upon whether the associated motor is to be speeded up or slowed down.

Since the switches 105 and 106 turn with the follower 48, they are connected to the phase shifting networks 74 and 74' through a collector ring assembly 119 (see Figs. 13, 14, 15 and 27) and brushes 120 and 121. Each of the three rings 122, 123 and 124 of the assembly are divided into quarter-circle segments, the successive segments being identified in the drawings by the superscripts $a$, $b$, $c$ and $d$. The contacts of each switch are connected to diametrically opposite collector ring segments. Thus, the movable contact 125 of the switch 105 is connected to the segments $123^a$ and $123^c$ while one stationary contact 126 is connected to the segments 124ª and 124ᶜ and the stationary contact 127 is connected to the segments 122ª and 122ᶜ. In the other switch 106, the movable contact 128 is connected to the segments 123ᵇ and 123ᵈ, the stationary contact 129 to the segments 124ᵇ and 124ᵈ and the stationary contact 130 to the segments 122ᵇ and 122ᵈ. The brushes 120 and 121 are spaced apart angularly 90 degrees so that they engage adjacent collector ring segments. The brushes 120 connect the ring 122 to the mid-portion of the resistor 115, the ring 124 to the resistor 116 and the ring 123 to a point between the two resistors. The brushes 121 similarly connect the rings and the resistors 117 and 118.

With the foregoing arrangement, the switches 105 and 106 always are effective to change the energization of different motors and each acts to make such a change for a proper correction regardless of the direction in which the follower 48 is travelling. For example, if the selector 61 is inaccurately set when the follower is moving along the edge 111 of the pattern, as previously discussed in connection with Fig. 28, the follower 48 tends to move toward the template 49. This causes the rod 99 to rock about the axis $b$ and swing the wedge 110 toward the pattern (up in Fig. 27). As a result, the contacts 125 and 127 of the switch 105 are engaged as are the contacts 128 and 130 of the switch 106. Since the brushes 120 at this time contact the segments 122ᵇ, 123ᵇ and 124ᵇ and the brushes 121 engage the segments 122ª, 123ª and 124ª, parts of the resistors 115 and 118 are short circuited. The effect of this is to counteract the action of the reactor 67 and supplement the action of the reactor 60 thus reducing the speed of the motor 46 and increasing the speed of the motor 22.

The change in motor speeds causes the components to approximate more closely those represented by the arrows 113 and 114. Should there be an over-correction, the rod 99 will return to the vertical position restoring the phase shifting networks to their original conditions. This will produce a hunting action as the tracer 48 follows the pattern 49. The frequency of the hunting action may be reduced by making the connections between the collector rings and the resistors as slide wires so that the short circuited portion of each resistor may be varied.

When the pattern 49 requires the follower 48 to travel in a different direction, the brushes 120 and 121 contact another pair of collector ring segments. If the follower be moving along the edge 131, for example, the speed components of the motors 22 and 46 should be as represented by the arrows 132 and 133 in Fig. 29. Assuming that the selector 61 is tilted to produce the speed vectors 132' and 133' instead, the follower tends to move into the pattern and again the movable contacts 125 and 128 engage the contacts 127 and 130. At this time, however, the sleeve 57 and all the parts supported thereon have been turned so that the brushes 120 contact the segments 122ª, 123ª and 124ª and the brushes 121 contact the segments 122ᵈ, 123ᵈ and 124ᵈ. Thus, portions of the resistors 115 and 117 are short-circuited speeding up the motor 46 and slowing the motor 22.

Similarly, when the follower tends to move into the pattern as it travels along the edge 134 or along the edge 135, the rod 99 rocks to move the contacts 125 and 128 again into engagement with the contacts 127 and 130 respectively. In the former case, the brushes 120 and 121 are contacting the segments 122ᵈ, 123ᵈ and 124ᵈ and 122ᶜ, 123ᶜ and 124ᶜ so that the speed of the motor 22 is increased while that of the motor 46 is reduced to change the speed vectors toward the proper values as indicated by the arrows 136 and 137 in Fig. 30. In the latter case, illustrated in Fig. 31, the arrangement is such as to speed up the motor 46 and slow down the motor 22 to compensate for the deviation between the actual vector components 138' and 139' and the desired components 138 and 139. If, in the examples given above, the selector should be tilted to cause the follower to drift away from the pattern, the spring 103 (Fig. 14) rocks the rod 99 so as to move the switch contacts 125 and 128 against the other stationary contacts 126 and 129 and this varies the energization of the motors oppositely from that described above to provide the proper correction.

In profiling certain workpieces, it is necessary to cut a beveled edge. The bevel may extend either back or forwardly as indicated at 140 and 141 at opposite endes of the workpiece shown in Fig. 10. Further, the bevelled edge may extend around a curve such as in the case in Fig. 11 where the edge 142 of the workpiece 10' is bevelled through a complete circle.

In prior attempts to provide a miling machine which is capable of forming a bevel on the work edge, difficulty has been encountered in simultaneously maintaining the desired bevel angle and obtaining the proper contour or outline of the workpiece where the tool travelled around curved portions of the work. Comparatively complex compensating mechanisms have been proposed to change the angular disposition of the tool continuously as it moves around a curve in an effort to approximate the desired shape as closely as possible.

According to the present invention, the parts are arranged and correlated in a novel manner so as to produce both the exact bevel and the exact contour desired and this without using any compensating devices. To this end, the cutter spindle 13ª is supported both for tilting and for bodily turning about an axis $c$ (Figs. 4 and 7) normal to the workpiece while in a tilted position. The spindle is turned about this axis in synchronism with and through angles corresponding to the angular movement of the tool 13 around the workpiece 10. In this way, the tool always is properly disposed to cut the workpiece to the desired shape.

The spindle 13ª additionally may be supported for axial movement to cut a continuous bevel on workpieces which have raised and depressed portions and, in general, to raise the tool without changing the angle of tilt of the spindle. In Fig. 11, for example, the workpiece 10' has a succession of ridges 143 and, in cutting the bevelled edge 142, the spindle would be moved axially upwardly to keep the tool in engagement with the entire surface of this edge without changing the angle of the bevel. Also, the spindle may be arranged for lateral shifting to place the edge of the cutting tool on the axis $c$ when the spindle is vertically disposed. In this way, the pattern 49 may be exactly full size since it is not necessary to compensate for the size of the tool in making the pattern.

In the present instance, the spindle 13ª is supported for the movements described above by journaling the head 15 on the frame 43 to turn about the axis $c$ while the spindle motor 14 is supported to tilt on the frame about a horizontal axis $d$ (Fig. 7). The latter is achieved through the medium of an arcuate slide member 144 and an intermediate slide member 145 which are shiftable relative to each other and to the motor 14 to obtain the lateral and axial movement of the spindle. Thus, the head 15 turns on the frame 43, the member 144 slides arcuately on the head, the member 145 slides laterally of the spindle axis on the member 144, and the motor 14 together with the spindle 13ª slides axially on the member 145.

The head 15 is a hollow casting having open sides and disposed between vertically spaced arms 146 and 147 (Fig. 4) which project forwardly from the frame 43. At its upper and lower ends, the head is journaled in the arms of the frames by anti-friction bearings 148 to rotate about the axis $c$. The head is turned about this axis by a reversible motor 149 (Fig. 22) secured to the arm 146 and operating through a worm 150 and a worm wheel 151 which is fast on the upper end of the head and is concentric with the axis $c$. On the inner sides of the side portions 152 of the head are formed arcuate grooves 153 which oppose each other with their centers disposed on the common axis $d$ extending horizontally near the tool 13 and intersecting the axis $c$. Each arcuate sliding member 144 is formed with an arcuate lug 154 mating with one of the grooves 153 which thus constitute ways supporting the member for movement about the axis $d$. Such movement is effected by power through the use of a reversible motor 155 (Fig. 3) mounted on the head 15 and driving a worm 156 (Fig. 4) through gearing 157. The worm meshes with a worm segment 158 integral with one of the arcuate sliding members 144 and centered about the axis $d$.

On the inner sides of the arcuate members 144 are dove-tailed ribs 159 (Fig. 7) which extend transversely of the spindle axis $e$ (Fig. 4). The ribs are received in mating grooves 159a in the intermediate sliding members 145 to support the latter for sliding along the ribs relative to the members 144. A screw 160 (Fig. 9) paralleling the ribs is threaded into a nut 161 on one of the arcuate members 144. A shank portion of the screw projects through an ear 162 and is held against axial movement by collars 163 engaging opposite sides of the ear. Through a squared end 164 on the screw, the latter may be turned to slide the members 145 on the members 144. On the opposite sides of the members 145 are second dove-tailed grooves 165 disposed at right angles to the grooves 159. The grooves 165 receive mating ways 166 formed on the sides of the spindle motor housing to support the motor 14 and hence the spindle 13a for axial movement. Such movement is effected by a motor 167 (Fig. 9) driving a screw 168 (Fig. 2) through a worm 169, a worm wheel 170 and gears 171. The screw, which parallels the ways 166, is journaled on the housing of the motor 14 and is threaded into a nut 172 on one of the members 145 whereby turning of the screw slides the ways in the grooves 165.

Means is provided to turn the head 15 about the axis $c$ automatically in synchronism with the angular changes in the direction of movement of the tool 13. This means comprises a control mechanism which energizes the motor 149 so as to turn the head through angles equal to the angles through which the tool is moved relative to the workpiece. Preferably, the control mechanism responds to the movement of the follower 48 and, for this purpose, turning of the sleeve 57 actuates the control mechanism. The latter includes a self-synchronous motor follow-up system in which the rotor 173 (Fig. 24) of the transmitting motor 174 (Fig. 14) is turned by the sleeve 57 through a ring gear 175 integral with the sleeve and meshing with a spur gear 176 on the rotor shaft 177. As is well known in the art, turning of the rotor 174 tends to turn the rotor 178 of the receiving motor 179 in the same direction until the two rotors assume corresponding positions.

As shown in Fig. 24, the rotor 178 is connected to a switch arm 180 which is movable between two stationary contacts 181 and 182. These contacts are connected through lines 183 and 184 to the motor 149 for turning the head 15. When the switch arm engages the contact 181, the motor 149 is energized to turn the head clockwise as viewed in Fig. 9 and the motor is reversed upon engagement between the arm and the contact 182. Thus, through the self-synchronous motors 174 and 179, the motor 149 is energized to turn the head 15 upon turning of the sleeve 57. The receiver 179 is mounted on the arm 146 (Fig. 4) of the frame 43 with the rotor 178 disposed along the axis $c$ and the rotor is turned with the head through an internal gear 185 (Fig. 22) on the head and gearing 186. This restores the rotor 178 to the balanced position and deenergizes the motor 149 when the head reaches an angular position corresponding to that of the sleeve 57. In this way, therefore, the head closely follows the turning of the sleeve and hence is turned in synchronism with the angular traversing movement of the tool 13. If desired, the head may be turned independently of the sleeve 57 by manually depressing push button switches 187 and 188 (Fig. 24) which are connected in parallel with respect to the contacts 181 and 182 respectively. The motor 149 is connected across the supply lines 189 from the alternating current source 78 through either the switch arm 180 or through one or the other of the push button switches.

In some instances, it is desirable to change the angle of the bevel of the work edge as the tool moves around the workpiece. For example, the edge of the workpiece 10 (Fig. 10) has a positive bevel angle at one end, a zero angle in the central portion and a negative angle at the opposite end. To change the bevel angle automatically as the tool traverses the work, means is provided to energize the motor 155 selectively so as to slide the member 144 on the arcuate ways 153 and thereby incline the spindle 13a at the proper angle to obtain the desired bevel. This means comprises a pattern part 190 (Figs. 14, 19, 20 and 21) whose shape is correlated with the changes in the bevel angle and which, through a follower 191, energizes the motor 155 in one direction or the other.

Similarly, it is desirable to move the spindle 13a axially back and forth as the tool 13 encounters depressions and raised portions in the workpiece. This also is achieved herein by a tracer 192 which engages a template part 193 and energizes the motor 167 for sliding the spindle motor 14 in the ways 165. Again, the shape of the part 193 is correlated with the workpiece shape, in this case with the rises and falls in the work, so that the axial position varies in accordance with the shape of the work. Axial shifting of the spindle also changes the position of the tool 13 relative to the axis $d$ and thus varies the effect of tilting of the spindle. For example, the tool may be spaced from the axis $d$ as in Fig. 5, or have this axis coincide with the lower end of the tool (Fig. 6) or have the axis at the midpoint of the tool as in Fig. 8. As shown by the broken line positions of the tool, tilting of the spindle produces a different result in each case.

In the present instance, both of the template or pattern parts 190 and 193 are in the form of ribs upstanding from the pattern 49 along the margin thereof and the tracers 191 and 192 are supported by the arm 51 alongside the follower 48. Rises and falls in the rib 190 control the angle of tilting of the spindle 13a while similar changes in the contour of the rib 193 vary the axial position of the tool 13. The rib 190 varies up and down from a reference level 194 (Figs. 20 and 21) with rises lifting the tool and falls lowering the tool. In the same manner, the rib 193, when above the reference level 195, causes the spindle to tilt for a positive bevel angle and produces a negative bevel when below this level.

Both of the followers 191 and 192 are similar in construction and operate to control their respective motors in the same manner. Thus, the follower 192 is secured to the lower end of a vertical rod 196 (Fig. 14) which slides in a bore 197 in the block 102. The follower rides on top of the rib 193 and is urged against the latter by a compression spring 198 encircling the rod and acting between the follower and the underside of the block. A shoulder 199 formed by the enlarged upper end portion of the rod engages the top of the block to limit downward movement of the rod. Projecting radially inwardly from the upper end of the rod is an arm 200 on the outer end of which is an upstanding finger 201 disposed along the axis $a$. The finger projects through a horizontal plate 202 which, through the medium of bearings 203 pressed into the plate, slides on three vertical posts 204 projecting up from the top of the block 102. The plate is supported by the finger 201 and thus is moved up and down with the rod 196 and the follower 192 in response to rises and falls in the rib 193.

Up and down movement of the plate 202 is utilized to drive the motor 167 in one direction or the other to shift the spindle 13a axially up or down. This is achieved by arranging the plate to move the core 205 of a reactor 206 (Fig. 15) whose coil 207 is supported within the housing 59 in a vertical cylinder 208. The rod 209 carrying the core 205 is attached to a bracket 210 which is bolted to the side of an upright bar 211. The latter slides vertically in the housing and is formed with spaced laterally projecting fingers 212 which straddle the marginal portion of the plate 202. The fingers permit the plate to turn with the sleeve 57 but cause the bar 211 and hence the core 205 to move up and down with the plate. The motor 167 is similar to the motors 22 and 46 and is energized by the reactor 206 through control networks like those associated with the reactors 60 and 67, these networks being shown as a unit at 213 in Fig. 25.

In order to rebalance the reactor 206 when the axial position of the spindle 13$^a$ corresponds to the position of the follower 192 and thereby deenergize the motor 167, a self-synchronous follow-up system shifts the coil 207 axially until the core 205 is centered relative to the coil. This system comprises a transmitting motor 214 (Fig. 25) whose rotor 215 is turned by the motor 167. This causes a corresponding turning of the rotor 216 of the receiving motor 217. As shown in Figs. 15 and 25, the rotor 216 operates through a gear reduction 218 to turn a screw 219 threaded into a nut 220 on a bracket 221. The latter projects through a vertical slot 222 in the cylinder 208 and is fastened to the coil 207. The coil is slidably received within the cylinder and thus moves up and down by the nut 220 upon turning of the screw 219. With this arrangement, the motor 167 responds to vertical movement of the follower 192 and continuously positions the spindle 13$^a$ axially in accordance with the shape of the template part 193 as the latter is traversed by the follower.

The follower 191 controls the energization of the tilting motor 155 through control and follow-up systems similar to those used to energize the motor 167. The elements of these systems are identified in the drawings by the same but primed reference characters.

Provision is made to raise the followers 48, 191 and 192 above the templates 49, 190 and 193 as shown in Fig. 18 so that the arm 51 may be traversed over the templates for such purposes as to the starting position. To this end, the block 102 is slidable vertically in the sleeve 57 carrying the followers up and down with it and is moved in the sleeve through the action of a solenoid 223 (Figs. 13 and 14) mounted within the housing 59. Carried by the armature of the solenoid is a rod 224 which moves down when the solenoid is energized. Through a connecting link 225, the rod turns a gear 226 which is journaled in the housing 59 on a shaft 227 and meshes with a rack 228. The latter is formed on the back of a bar 229 slidable vertically in the housing and held against turning by a screw 230 which is threaded through a boss 231 in the housing and projects into a longitudinal slot 232 in the bar. Fingers 233 bolted to the bar straddle the flange 107 so that the gear 226 when turned by the solenoid 223 raises the bar 229 and hence the block 102.

The block 102 is lowered by means of coiled compression springs 234 (Fig. 15) vertically disposed within slots 235 in the sides of the block. At their lower ends, the springs bear against the block while the upper ends engage ears 236 secured to the inside of the sleeve 57 and projecting into the slots 235. Thus, the springs continuously urge the block 102 downwardly and move the block in this direction upon deenergization of the solenoid 223, the rod 229 also being returned to its original position by the springs through the medium of the rack 228 and the gear 226.

The lowermost position of the block 102 is determined by separate lug 237 clamped to the side of the block by a screw 238 and engageable with the top of the sleeve 57. This position may be varied by raising or lowering the lug as permitted by an elongated slot 239 in the lug through which the screw 238 projects. As the block is raised, it engages the shoulders 199 and 199' on the rods 196 and 196' picking up the rods and thus lifting the followers 191 and 192 with the block. When the block is in its lower position and the followers are at the reference levels 194 and 195, the shoulders are spaced above the block as shown in Fig. 14 to permit the rods 196 and 196' to drop as well as to rise with changes in the shapes of the template parts 190 and 193.

With reference to the control circuits illustrated in Figs. 23 through 26, a "Control Start" push button switch 240 which is normally open is connected in the circuit of a relay 1N across the alternating current supply lines 189. When the relay is energized, it closes contacts 1N-1, 1N-2, 1N-3 and 1N-4. The latter two sets of contacts connect the motors 22 and 46 (Fig. 27) for the generators 79 and 79' with the supply lines 81. The other two sets of contacts connect the supply lines 81 with the motors for the generators used in the control networks 213 and 213' for energizing the tilting and axial movement motors 155 and 167. The relay also completes its own holding circuit through contacts 1N-5 and a normally closed "Stop" push button switch 241.

A normally open push button switch 242 is in the line 243 connecting a relay 2N across the supply lines 189. The contacts 2N-1 of this relay connect the spindle motor 14 to the three phase current supply lines 81. The contact 2N-2 completes the holding circuit for the relay around the switch 242. The energizing circuit of the relay 2N is completed upon closing of the contacts 1RR-1 of a relay 1RR. The latter is connected across the lines 189 through a "Run" push button switch 244, the normally closed contacts 5CR-1, 4CR-1 and TUR-1 of the relays 5CR, 4CR and TUR, and through the normally closed push button switches 245 and 246. The relay 1RR closes contacts 1RR-2 in its holding circuit as well as contacts 1RR-3 in the circuit of the relay 1ESR and the contacts 1RR-4 in the circuit of the relay 2CR. When the relay 1RR is energized, an operating light 247$^a$ in parallel with the relay is lighted.

Provision is made to raise and lower the spindle 13$^a$ independently of the template parts 190 and 193. To this end, a "Cutter Up" push button switch 247 completes the circuit of the relay 4CR through a limit switch LS-3 which is mounted on the head 15 with its actuator 248 engageable with an operator 249 (Fig. 4) when the spindle is raised, the limit switch being closed until the spindle reaches the uppermost position. The contacts 4CR-1 open the circuit of the relay 1RR to stop the spindle motor 14 while the contacts 4CR-2 close a holding circuit. Normally closed contacts 4CR-3 are opened in a line 250 (Figs. 23 and 25) forming the circuit of a relay RSR which thus is deenergized. This results in the opening of contacts RSR-1 in the holding circuit and contacts RSR-2 and RSR-3 in the circuits of the self-synchronous motors 214 and 217 to disable the latter.

Energization of the relay 4CR also opens the normally closed contacts 4CR-4 in the circuit of the relay 1ESR deenergizing the latter so that the contacts 1ESR-1 and 1ESR-2 (Fig. 24) are open. The latter contacts deenergize relays 1M, 2M, 3M, 4M and 5M. In the relay 2M, this opens the contacts 2M-2 in the circuit of the motor 22 and closes contacts 2M-1 in a dynamic braking circuit 251 for the motor. The relays 1M, 3M and 4M open similar contacts in the corresponding circuits of the motors 46, 167 and 135. Deenergization of the relay 5M opens contacts 5M-1 and 5M-2 in the circuit of the motor 149. Thus, depressing the push button switch 247 inactivates the control systems energizing the motors for traversing, tilting and raising the spindle 13$^a$ and also inactivates the follow-up system for the motor 167 (Fig. 25). In this condition of the parts, the motor 167 is connected across a direct current source (not shown) through supply lines 252 and conductors 253 by contacts 4CR-5 and 4CR-6. The latter are closed by the relay 4CR and are in the conductors 253 which connect the motor 167 to turn in the direction to raise the spindle.

To lower the spindle 13ª, a push button "Cutter Down" switch 254 is closed to complete the circuit of the relay 5CR through a limit switch LS–2. The latter, like the limit switch LS–3, is mounted on the head 15 with its actuator 255 (Fig. 4) engageable by the operator 249 and this switch is closed when the spindle is in the up position. Energization of the relay 5CR completes a holding circuit through contacts 5CR–1 and opens normally closed contacts 5CR–2, 5CR–3, 5CR–4, 5CR–5 and 5CR–6. The first three of these contacts disable the mechanism for raising the cutter and, as will be described later, the circuits for raising and lowering the followers 48, 191 and 192. Opening the contacts 5CR–5 deenergizes the relay 1ESR which, in the manner described above, disables the followers and the control systems energize thereby.

Also closed by the relay 5CR are contacts 5CR–7 and 5CR–8 in lines 256 which connect the motor 167 with the direct current supply lines 252 in such a manner as to drive the motor in the direction to lower spindle 13ª. When the spindle reaches the down position, the self-synchronous motors 215 and 217 of the follow-up system are returned to the balanced position and conditioned for operation by closing a "Reset" push button switch 257 in the line 250 of the relay RSR. The latter thus is energized closing the contacts RSR–1, RSR–2 and RSR–3.

In order to raise the template followers 48, 191 and 192 by raising the block 102, the solenoid 223 is energized by depressing and thereby closing a "Tracer Up" push button switch 258 (Fig. 23) which completes the circuit of the relay TUR. This relay opens the contacts TUR–1 to stop the spindle motor 14 and closes contacts TUR–2. The latter complete the circuit of the solenoid. Additionally, the relay TUR closes its holding circuit through contacts TUR–3 and disables the follow-up mechanism of the motor 167 by opening contacts TUR–4. These contacts deenergize the relay RSR in the same manner as does the opening of the contacts 4CR–4 or 5CR–5. The solenoid 223 is deenergized to permit the springs 234 to lower the block 102 by depressing the normally closed "Tracer Down" push button switch 245 which opens the holding circuit of the relay TUR and deenergizes the latter.

The control systems for the two feed motors 22 and 46 are conditioned for operation under the control of the selector 61 when the spindle 13ª is both up and down so that the tool 13 may be traversed either above or through the work. These systems are, however, rendered inoperative as the spindle is moved up or down and also when the spindle is up but the followers 48, 191 and 192 are not. To these ends, the control and energizing circuits are prepared for operation by a relay 1CR when the spindle is up and by a relay 2CR when the spindle is down and both relays are deenergized as the spindle is raised or lowered, the relay 1CR also being deenergized when the followers are down whether the spindle is up or not.

In the circuit of the relay 1CR is a limit switch LS–4 which is mounted with and mechanically connected to the limit switch LS–3 so as to be closed only when the spindle 13ª is up. The circuit of this relay also includes the contacts 1RR–4 of the relay 1RR and also a limit switch LS–5. The latter, as shown in Fig. 14, is stationarily supported within the housing 59 with its actuator 259 positioned to be engaged by an operator 260. The operator is secured to the bar 229 so that the limit switch is closed when the block 102 and hence the followers are in the up position. Also, in the circuit of the relay 1CR are the normally closed contacts 5CR–6 of the relay 5CR and the normally open contacts 1ESR–1 of the relay 1ESR which is energized by closing the contacts 1RR–3 upon energization of the relay 1RR.

The circuit of the relay 1CR is completed when the contacts 1VR–1 and 2VR–1 (connected at V—V in Fig. 23 and shown in Fig. 26) are closed. These contacts are parts of relays 1VR and 2VR which are connected respectively across the outputs of the generators 79' and 79 so that the relays are deenergized and the contacts are closed only when there is no output from the generators. In this way, the relays 1VR and 2VR prevent the energization of the relay 1CR when there is an output from the generators and hence insure that the motors 22 and 46 start at a low voltage. Thus, if the spindle and the followers are up and there is no output from the generators, the relay 1CR is energized.

When the relay 1CR is energized, it completes its own holding circuit through contacts 1CR–1, thus bypassing the contacts 1VR–1 and 2VR–1, and it closes contacts 1CR–2 in the circuit of a relay 6CR (Fig. 24). The latter circuit, therefore, is completed through the contacts 1CR–2, 1CR–1, 1ESR–1 and 5CR–6. When the relay 6CR is energized, it closes contacts 6CR–1, 6CR–2, 6CR–1' and 6CR–2' which close the input circuits to the regulators 84 and 84'. The relay 1CR also completes the circuits of the armatures of the motors 22 and 46 by closing contacts 1CR–3 which, together with the contacts 1ESR–2, completes the circuits of relays 1M and 2M (Fig. 24). The latter, when energized, close the contacts 1M–1 and 2M–2 (Fig. 26) in the motor armature circuits. The relays 1M and 2M also close the contacts 1M–2 and 2M–1 in the braking circuits 251' and 251. Thus, when the relay 1CR is energized, the motors 22 and 46 are conditioned for operation under the control of the selector 61.

As the spindle 13ª is lowered, the limit switch LS–4 opens and the relay 1CR thereby is deenergized so that the motors 22 and 46 will not operate even if the selector 61 is moved. When the spindle reaches its lower position, the control and motor circuits again are conditioned for operation by the relay 2CR. For this purpose, a limit switch LS–1 (Figs. 23 and 4), also actuated by the operator 249, is closed as is a limit switch LS–6 which is closed when the limit switch LS–5 is open, that is, when the followers 48, 191 and 192 are down. The switches LS–1 and LS–6 complete the circuit of a relay 3RR which thereupon closes contacts 3RR–1 in the circuit of the relay 2CR. Like the circuit of the relay 1CR, the circuit of the relay 2CR is through the contacts 1VR–1 and 2VR–1 whereby the control and energizing circuits again are closed only if there is no output from the generators 79 and 79'. The relay 2CR functions in the same manner as the relay 1CR, that is, it completes a holding circuit through contacts 2CR–2 and energizes the relay 6CR and the motor relays 1M and 2M by closing contacts 2CR–1 and 2CR–3 respectively.

Suitable overload controls, indicated at 261 in Fig. 23, may be included in the circuit of the relay 1ESR to deenergize the motor relays 1M, 2M, 3M, 4M and 5M if the feed motors 22 or 46 are overloaded. Similar controls 262 for the motors 155 and 167 may open the circuit of a relay 2ESR which, when deenergized, opens contacts 2ESR–1 (Fig. 24) which deenergizes the motor relays. As shown in Fig. 24, the field windings 263 and 264 of the motors 167 and 155 are connected across the direct current supply 77 in parallel with the windings 76 and 76'. The control field windings 265 and 266 for the control of the motors 167 and 155 similarly are connected across the supply 77. Suitable electromagnetic clutches (not shown) in the drives of the motors 22 and 46 may be employed and the coils 267 and 268 (Fig. 25) are connected across the output of a rectifier 269 which, in turn, is connected across the alternating current supply lines 189.

With the foregoing arrangement, the machine is prepared for operation by depressing the "Control Start"

push button switch 240. If the spindle 13ª and the followers 48, 191 and 192 are up at that time, the selector 61 may be tilted to traverse the tool 13 and the followers over their starting positions. The selector then is released and the "Cutter Down" and "Tracer Down" push button switches 254 and 245 are depressed to lower the spindle and the followers. The buttons 244 and 242 are then depressed and the machine then is in condition to cut the workpiece by manipulating the selector as described above.

I claim as my invention:

1. In a machine tool, the combination of, a work support, a member mounted for movement along a predetermined path relative to said support, a tool support mounted on said member for bodily movement therewith and for movement relative to the member along a second and perpendicular path, a first power actuator for moving said member along said first path, a second power actuator for moving said tool support along said second path, a selector manually movable in a plurality of directions, control mechanism responsive to said selector and operable to energize said actuators in a proportion correlated with the direction of selector movement thereby to move said tool support in a corresponding direction, an element for supporting a template, a template follower carried by said tool support and engageable with the template whereby the tool support is moved by manipulating said selector to move the follower along the template, said follower being mounted for movement relative to said tool support in a direction toward and away from the template and movable in such a direction when the direction of selector movement deviates from the direction of the template, and mechanism responsive to movement of said follower relative to said tool support to change the proportion of energization of said actuator and thereby correct the direction of movement of the tool support and the follower.

2. In a machine tool, the combination of, a work support, a member mounted for movement along a predetermined path relative to said support, a tool support mounted on said member for bodily movement therewith and for movement relative to the member along a second and perpendicular path, a first power actuator for moving said member along said first path, a second power actuator for moving said tool support along said second path, a selector manually movable in a plurality of directions, control mechanism responsive to said selector and operable to energize said actuators in a proportion correlated with the direction of selector movement thereby to move said tool support in a corresponding direction, an element for supporting a template, a template follower carried by said tool support and engageable with the template whereby the tool support is moved by manipulating said selector to move the follower along the template, a device responsive to deviations in the direction of selector movement and the direction of the template, and means activated by said device and operable to change the proportion of energization of said actuators thereby to correct the direction of movement of said tool support and said follower.

3. In a machine tool, the combination of, a work support, a tool support, power operated mechanism for moving said tool support relative to said work support through a predetermined angle, a member for supporting a template, a template follower carried by said tool support in engagement with said template and movable bodily with the tool support, said template follower being mounted on said tool support for movement relative to the same and toward and away from the template, a manually operable selector movable in a plurality of different directions, control means responsive to energize said power operated mechanism in accordance with the direction of selector movement whereby the selector is moved in a direction corresponding to the direction of the pattern edge, said follower moving relative to said tool support when one of said directions deviates from the other, and means responsive to relative movement between said follower and said tool support and operable upon such movement to modify the operation of said control means thereby to correct the direction of movement of said tool support.

4. In a machine tool, the combination of, a tool support, a work support, power operated mechanism for moving said tool support relative to said work support through a predetermined angle, a template follower carried by said tool support and movable bodily therewith, a member for supporting a template in engagement with said follower, a manually operable selector movable in selected directions, control means responsive to said selector and operable to energize said power operated mechanism in accordance with the direction of selector movement whereby the selector is moved in a direction corresponding to the direction of the pattern edge to cause the tool to cut the work to the desired shape, a member responsive to deviations in said directions, and means activated by said member operable to modify the operation of said control means thereby to correct the direction of movement of said tool support.

5. A machine tool having, in combination, a work support adapted to hold a workpiece in a predetermined plane, a tool support, a member journaled on said tool support to turn about an axis normal to said plane, a rotatable spindle adapted to carry a tool for cutting the workpiece, means supporting said spindle on said member to turn bodily therewith about said axis and to be tilted selectively relative to the axis, mechanism operable to move said tool support relative to said work support in a plane parallel to said predetermined plane and through a predetermined angle thereby to feed the cutter around the workpiece, a power actuator connected to said member and operable when energized to turn the member about said axis, and means responsive to the movement of said tool support for energizing said actuator to turn said member through an angle corresponding to and in synchronism with the angular movement of the tool support.

6. A machine tool having, in combination, a work support adapted to hold a workpiece in a predetermined plane, a tool support mounted to move relative to said work support in a plane parallel to said plane and through a predetermined angle, a member journaled on said tool support to turn about a first axis normal to said plane, a rotatable spindle adapted to carry a tool for cutting the workpiece, means supporting said spindle on said member to turn bodily therewith about said axis and to be tilted selectively relative to the axis, a pattern support rigid with said work support and adapted to hold a template corresponding in shape to the desired shape of the workpiece, a follower mounted on said tool support to move bodily therewith and to turn about a second and parallel axis, mechanism for moving said head to guide said follower around the template thereby to feed the cutter around the workpiece, said follower turning about said second axis with the changing contour of said template, a power actuator connected to said member and operable when energized to turn the member about said first axis, and means responsive to turning of said follower about said second axis for energizing said actuator to turn said member about said first axis through an angle corresponding to and in synchronism with the angular movement of said tool support.

7. A machine tool having, in combination, a work support adapted to hold a workpiece in a predetermined plane, a tool support mounted to move relative to said work support in a plane parallel to said plane and through a predetermined angle, a member journaled on said tool support to turn about a first axis normal to said plane, a rotatable spindle adapted to carry a tool for cutting the workpiece, means supporting said spindle on said member to turn bodily therewith about said axis and to be tilted selectively relative to the axis, a pattern support rigid with said work support and adapted to hold a template having first and second surfaces corresponding respectively to the desired shape of the workpiece and to the inclination of the edge thereof, a first follower mounted on said tool support to move bodily therewith in engagement with said first surface and to turn about a second and parallel axis with the changing contour of said template, a second follower mounted on said tool support to move therewith in engagement with said second surface, mechanism for moving said head to guide said followers around the template surfaces thereby to feed the cutter around the workpiece, a first power actuator connected to said member and operable when energized to turn the member about said first axis, means responsive to turning of said first follower for energizing said actuator to turn said member through an angle corresponding to and in synchronism with the angular movement of said tool support, and a second power actuator responsive to said second follower and operable to tilt said spindle.

8. A machine tool having, in combination, a work support adapted to hold a workpiece in a predetermined plane, a tool support mounted to move relative to said work support in a plane parallel to said plane and through a predetermined angle, a member journaled on said tool support to turn about a first axis normal to said plane, a rotatable spindle adapted to carry a tool for cutting the workpiece, means supporting said spindle bodily on said member to shift axially relative thereto and to be tilted selectively relative to said axis, a pattern support rigid with said work support and adapted to hold a template having first, second and third surfaces corresponding respectively to the shape of the finished workpiece, the inclination of the workpiece edge and the lateral contour of the edge, first, second and third followers mounted on said tool support to move bodily therewith and engaging said first, second and third surfaces respectively, mechanism for moving said head to guide said followers around said template surfaces thereby to feed the cutter around the workpiece, a first power actuator responsive to said first follower to turn said member through an angle corresponding to and in synchronism with the angular movement of said tool support, a second power actuator responsive to said second follower to tilt said spindle, and a third power actuator responsive to said third follower to shift said spindle axially.

9. A machine tool having in combination, a work support adapted to hold a workpiece in a predetermined plane, a tool support, a member journaled on said tool support to turn about an axis normal to said plane, a rotatable spindle mounted on said member to turn bodily therewith about said axis and to be tilted selectively relative to the axis, a cutting tool of predetermined diameter carried on said spindle, manually operable means for shifting said spindle transversely of said axis and relative to said member to displace the spindle from the axis a distance equal to the radius of the tool when the spindle and the axis are parallel, mechanism operable to move said tool support relative to said work support in a plane parallel to said plane and through a predetermined angle thereby to feed the cutter around the workpiece, a power actuator connected to said member and operable when energized to turn the member about said axis, and means responsive to the movement of said tool support for energizing said actuator to turn said member through an angle corresponding to and in synchronism with the angular movement of the tool support.

References Cited in the file of this patent

UNITED STATES PATENTS

| | | |
|---|---|---|
| 2,499,842 | Armitage | Mar. 7, 1950 |
| 2,660,930 | De Vlieg et al. | Dec. 1, 1953 |
| 2,674,160 | Martellotti | Apr. 6, 1954 |
| 2,753,244 | Dubosclard | July 3, 1956 |

FOREIGN PATENTS

| | | |
|---|---|---|
| 709,099 | Great Britain | May 12, 1954 |
| 1,072,582 | France | Sept. 14, 1954 |